US012322130B2

(12) United States Patent
Green et al.

(10) Patent No.: US 12,322,130 B2
(45) Date of Patent: Jun. 3, 2025

(54) METHOD FOR APPLYING CONTEXTUAL PRIVACY FILTERS TO MOVING OBJECTS TRACKED WITHIN A SPACE

(71) Applicant: VergeSense, Inc., Mountain View, CA (US)

(72) Inventors: Kelby Green, Mountain View, CA (US); Dan Ryan, Mountain View, CA (US)

(73) Assignee: VergeSense, Inc., Mountain View, CA (US)

( * ) Notice: Subject to any disclaimer, the term of this patent is extended or adjusted under 35 U.S.C. 154(b) by 394 days.

(21) Appl. No.: 17/979,646

(22) Filed: Nov. 2, 2022

(65) Prior Publication Data

US 2023/0135124 A1 May 4, 2023

Related U.S. Application Data

(60) Provisional application No. 63/274,899, filed on Nov. 2, 2021, provisional application No. 63/274,905, filed on Nov. 2, 2021.

(51) Int. Cl.
*G06K 9/00* (2022.01)
*A61K 35/12* (2015.01)
(Continued)

(52) U.S. Cl.
CPC ............... *G06T 7/70* (2017.01); *G06T 7/20* (2013.01); *G06V 10/44* (2022.01); *H04L 9/3236* (2013.01);
(Continued)

(58) Field of Classification Search
CPC .... G06K 9/00; G06T 7/70; G07C 1/10; H04L 63/1408; A61K 35/12
(Continued)

(56) References Cited

U.S. PATENT DOCUMENTS

| 10,042,818 B2 * | 8/2018 | Albano ............... G07C 1/10 |
| 2007/0109266 A1 * | 5/2007 | Davis ............... G06Q 30/02 345/163 |

(Continued)

OTHER PUBLICATIONS

A Lightweight Hash-Based Blockchain Architecture for Industrial IoT Byoungjin Seok , Jinseong Park and Jong Hyuk Park Department of Computer Science and Engineering, Seoul National University of Science and Technology, (Year: 2019).*

(Continued)

*Primary Examiner* — Seyed H Azarian

(74) *Attorney, Agent, or Firm* — Run8 Patent Group, LLC; Peter Miller

(57) ABSTRACT

A method includes: accessing a first frame; detecting a first object in the first frame; extracting a first location and a first set of features of the first object; transforming the first set of features into a first set of hash values; storing the first set of hash values in a first object container in a set of object containers; accessing a second frame; detecting a second object in the second frame; extracting a second location and a second set of features of the second object; transforming the second set of features into a second set of hash values; querying the set of object containers for the second set of hash values; and in response to a second object container containing a threshold quantity of hash values in the second set of hash values, identifying the second object as previously detected and represented by the second object container.

16 Claims, 6 Drawing Sheets

(51) Int. Cl.
  *G06T 7/20*    (2017.01)
  *G06T 7/70*    (2017.01)
  *G06V 10/44*   (2022.01)
  *H04L 9/32*    (2006.01)

(52) U.S. Cl.
  CPC ............... *G06T 2207/10024* (2013.01); *G06T 2207/30196* (2013.01); *G06T 2207/30201* (2013.01); *G06T 2207/30241* (2013.01); *G06T 2207/30242* (2013.01)

(58) Field of Classification Search
  USPC ....... 382/100, 103, 106–107, 156, 162, 172, 382/173, 181, 190, 199, 214, 216, 224, 382/254, 276, 286–291, 305; 345/163, 345/547
  See application file for complete search history.

(56) References Cited

U.S. PATENT DOCUMENTS

| | | | | |
|---|---|---|---|---|
| 2019/0334730 | A1* | 10/2019 | Endress | G16H 40/20 |
| 2022/0035686 | A1* | 2/2022 | Cristofi | H04L 63/1408 |
| 2023/0004315 | A1* | 1/2023 | Nagle | H04L 9/0894 |
| 2023/0032836 | A1* | 2/2023 | Pabón | G06F 3/0688 |

OTHER PUBLICATIONS

[HTML] Functional agricultural monitoring data storage based on sustainable block chain technology L Zhaoliang, W Huang, D Wang—Journal of Cleaner Production, 2021—Elsevier (Year: 2021).*

* cited by examiner

METHOD FOR APPLYING CONTEXTUAL PRIVACY FILTERS TO MOVING OBJECTS TRACKED WITHIN A SPACE

CROSS-REFERENCE TO RELATED APPLICATIONS

This Application claims the benefit of U.S. Provisional Application Nos. 63/274,899, filed on 2 Nov. 2021, and 63/274,905, filed on 2 Nov. 2021, each of which is incorporated in its entirety by this reference.

This Application is related to U.S. patent application Ser. No. 17/751,494, filed on 23 May 2022, which is incorporated in its entirety by this reference.

TECHNICAL FIELD

This invention relates generally to the field of workplace monitoring and more specifically to a new and useful method for applying contextual privacy filters to moving objects tracked within a space in the field of workplace monitoring.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
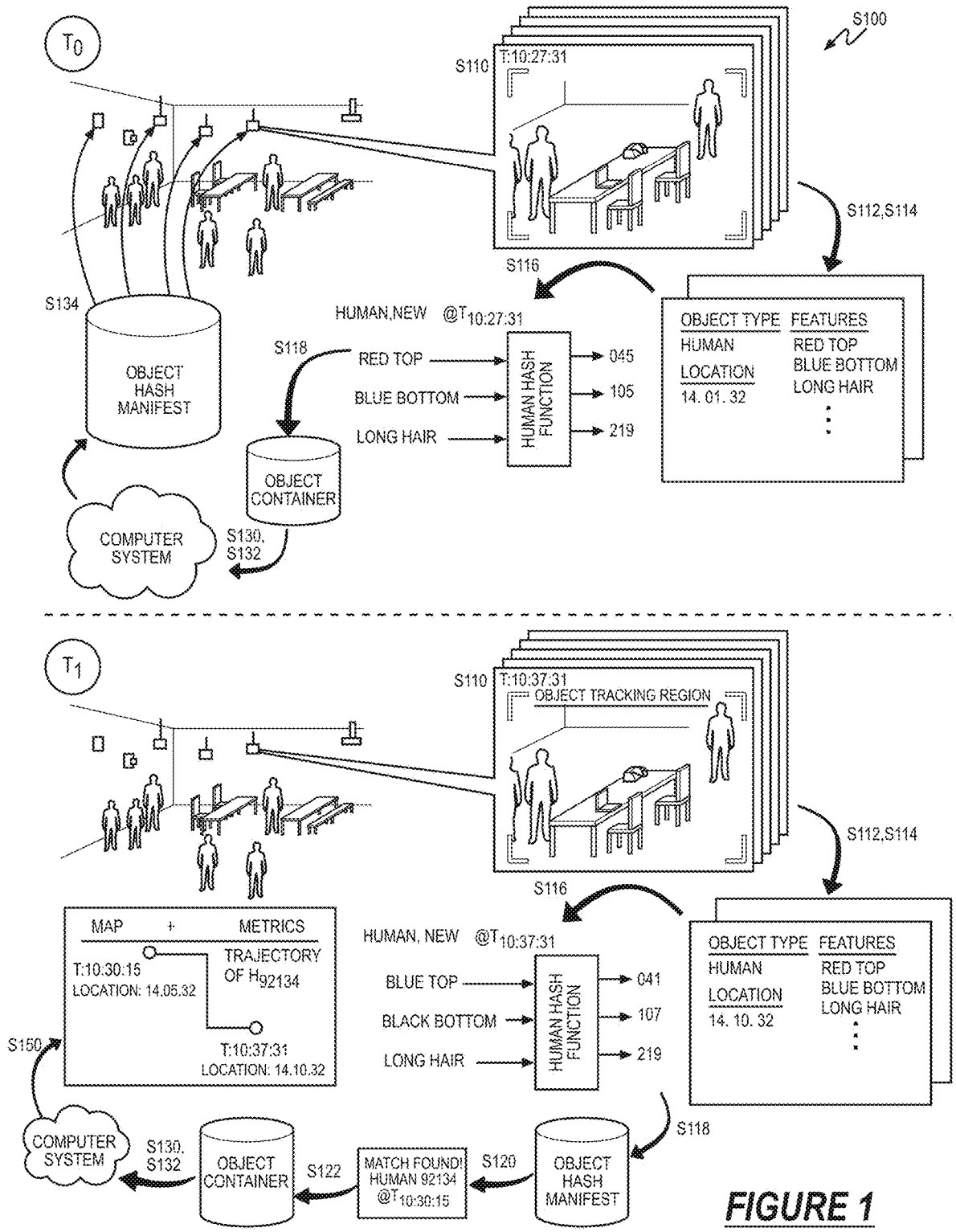
FIG. 1 is a flowchart representation of a method.
Figure 2:
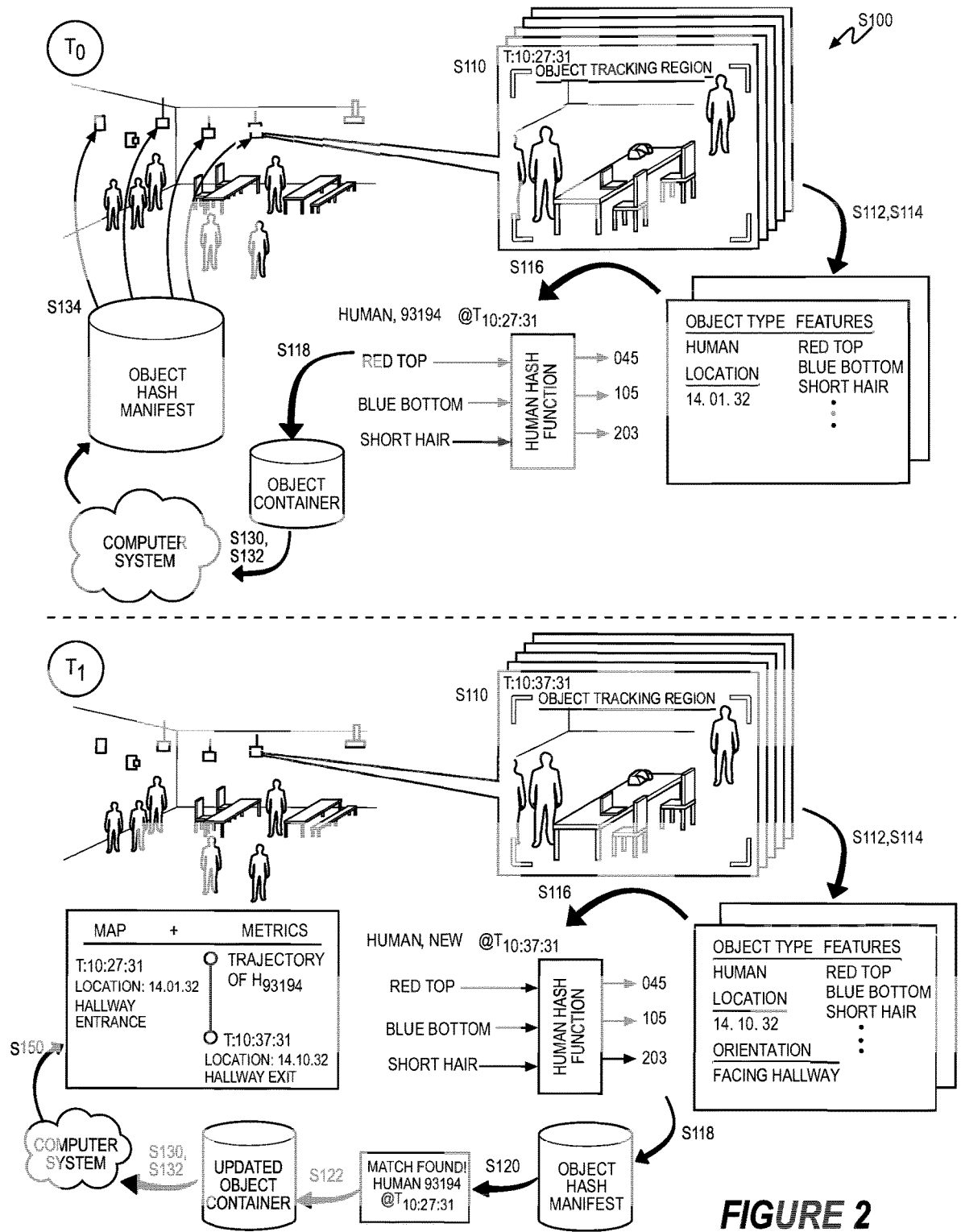
FIG. 2 is a flowchart representation of one variation of the method.

As shown in FIGS. 1 and 2, a method S100 for tracking objects moving within a space includes, at a first sensor block, in a set of sensor blocks, at a first time: accessing a first frame captured by a camera arranged in the first sensor block and located within the space in Block S110; detecting a first object in the first frame in Block S112; extracting a first location and a first set of features of the first object from the first frame in Block S114; transforming the first set of features into a first set of hash values according to an object hash function in Block S116; storing the first set of hash values in a first object container in Block S118; and transmitting the first object container and the first location of the first object labeled with the first time to a computer system in Block S130. The method S100 further includes, at the computer system: receiving a first set of object containers from each sensor block in the set of sensor blocks including the first object container in Block S132; and distributing the first set of object containers to the set of sensor blocks in Block S134. The method S100 also includes, at the first sensor block at a second time: accessing a second frame captured by the camera arranged in the sensor block in Block S110; detecting a second object in the second frame in Block S112; extracting a second location and a second set of features of the second object from the second frame in Block S114; transforming the second set of features into a second set of hash values according to the object hash function in Block S116; and querying the first set of object containers for the second set of hash values in Block S120. Responsive to a second object container, in the first set of object containers, containing a threshold quantity of hash values in the second set of hash values: identifying the second object as previously detected by a second sensor block in the set of sensor blocks and represented by the second object container in Block S122; transmitting the second location of the second object labeled with the second time to the computer system in Block S130; and generating an anonymized trajectory of the first object based on the first object container in Block S150.

Figure 3:
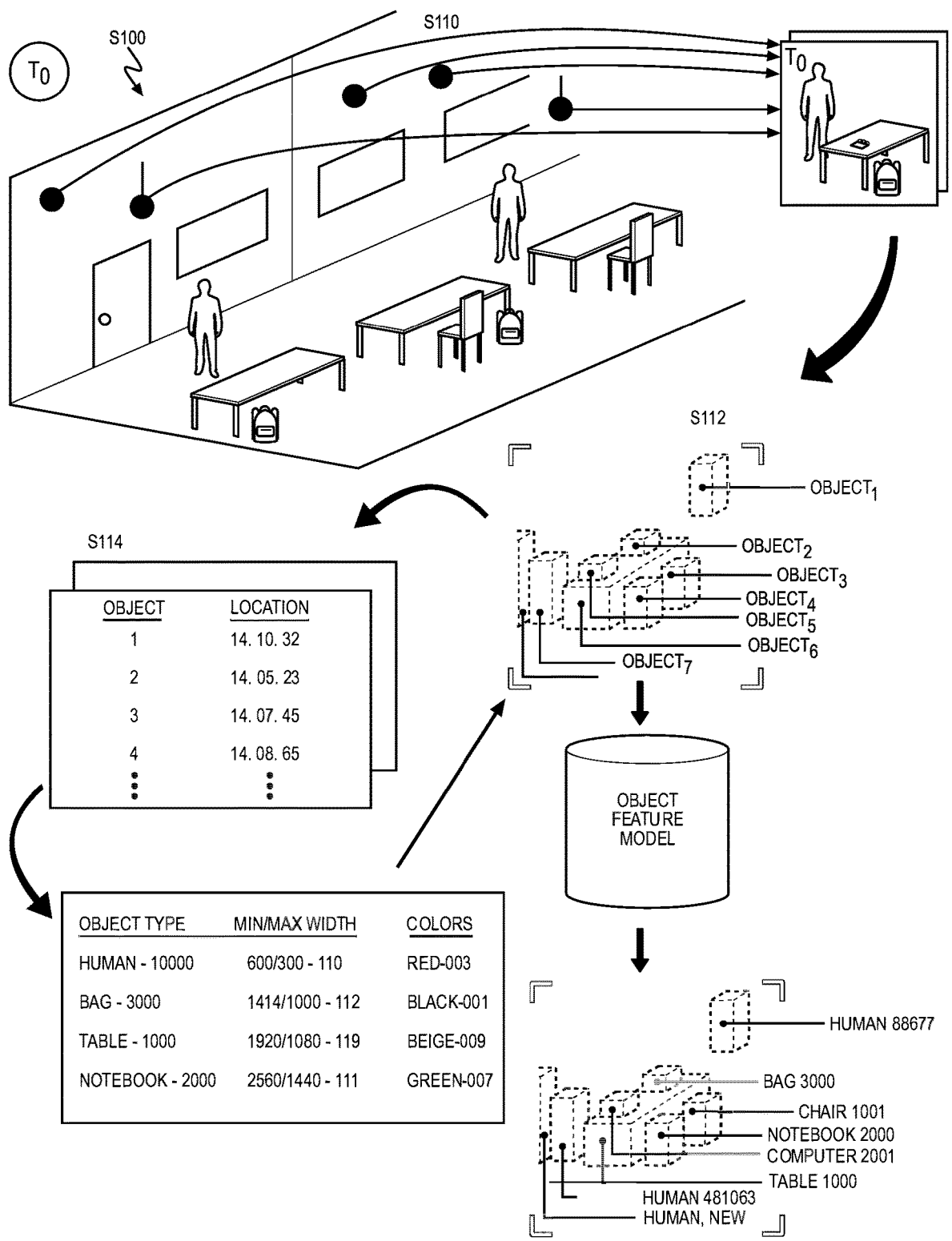
FIG. 3 is a flowchart representation of one variation of the method.

As shown in FIGS. 2 and 3, one variation of the method S100 includes at a first sensor block, in a set of sensor blocks, at a first time: accessing a first frame captured by a first camera arranged in the first sensor block and located within the space in Block S110; detecting a first object in the first frame in Block S112; extracting a first location and a first set of features of the first object from the first frame in Block S114; transforming the first set of features into a first set of hash values according to an object hash function in Block S116; storing the first set of hash values in a first object container in Block S118; and transmitting the first object container and the first location of the first object labeled with the first time to a computer system in Block S130. The method S100 further includes, at the computer system: receiving a first set of object containers from each sensor block in the set of sensor blocks including the first object container in Block S132; and distributing the first set of object containers to the set of sensor blocks in Block S134. The method S100 also includes, at a second sensor block at a second time: accessing a second frame captured by a second camera arranged in the second sensor block in Block S110; detecting a second object in the second frame in Block S112; extracting a second location and a second set of features of the second object from the second frame in Block S114; transforming the second set of features into a second set of hash values according to the object hash function in Block S116; querying the first set of object containers for the second set of hash values in Block S120; and, in response to a second object container, in the first set of object containers, containing a threshold quantity of hash values in the second set of hash values, identifying the second object as the first object previously detected by the first sensor block, in the set of sensor blocks, and represented by the first object container in Block S122 and transmitting the second location of the second object labeled with the second time to the computer system in Block S130. The method S100 also includes generating an anonymized trajectory of the first object based on the first object container in Block S150.

Figure 4A:
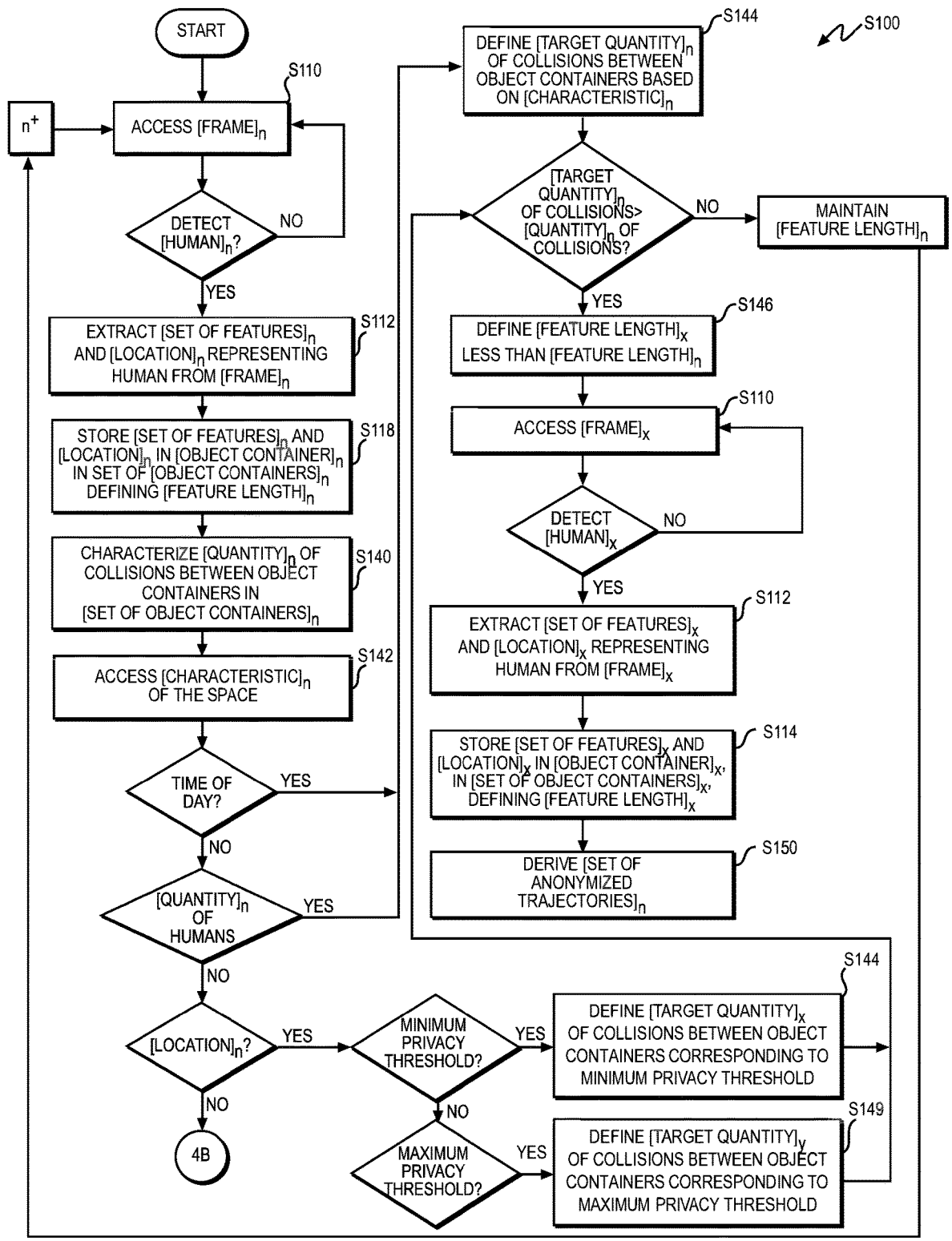
FIGS. 4A and 4B are a flowchart representation of one variation of the method.
Figure 4B:
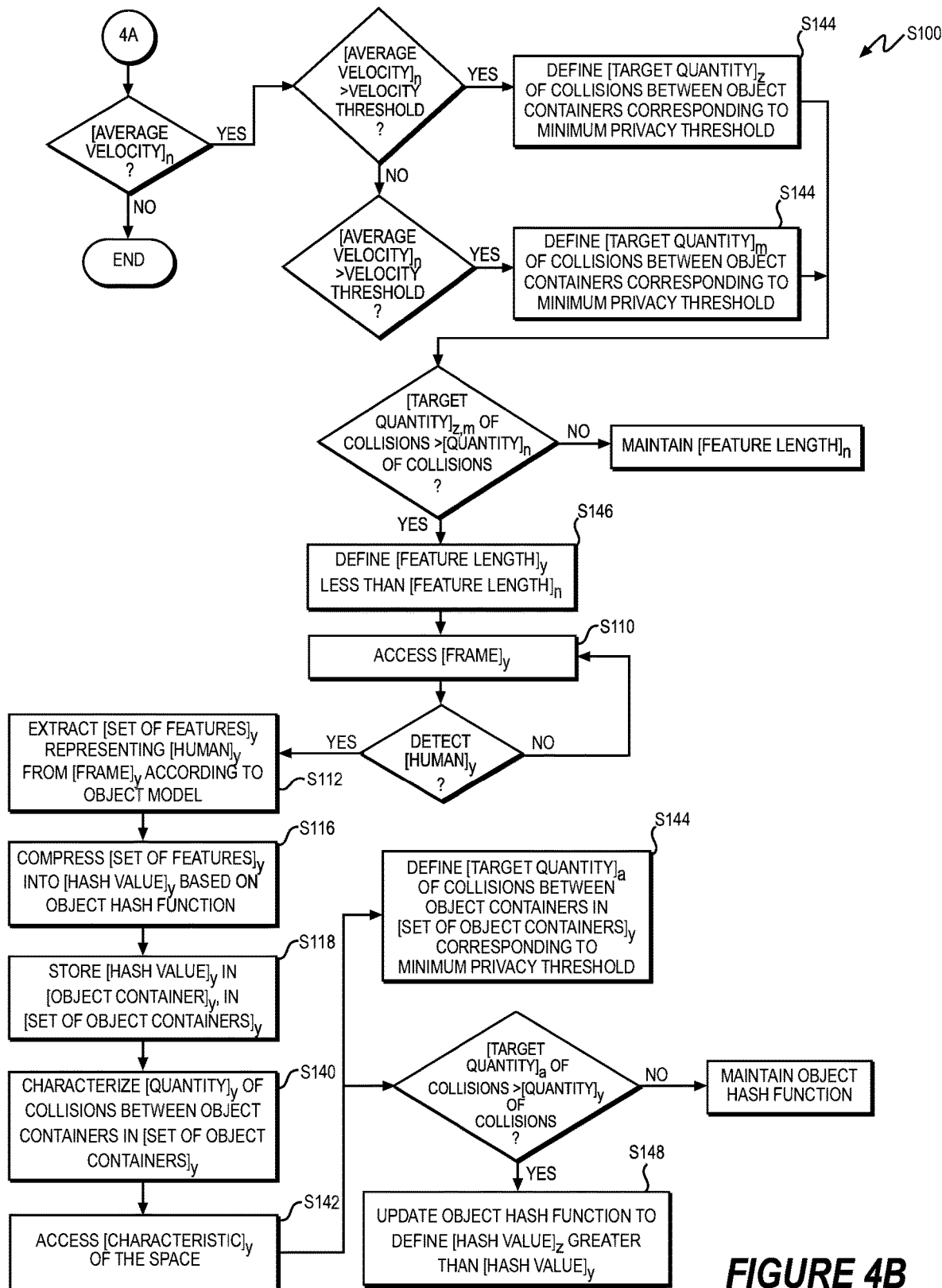

As shown in FIGS. 4A and 4B, one variation of the method S100 includes, at a first sensor block, in a set of sensor blocks, at a first time: accessing a first frame captured by a camera arranged in the sensor block and located within the space in Block S110; detecting a first object in the first frame in Block S112; extracting a first location and a first set of features of the first object from the first frame in Block S114; transforming the first set of features into a first set of hash values according to an object hash function in Block S116; storing the first set of hash values in a first object container in Block S118; and transmitting the first object container and the first location of the first object labeled with the first time to a computer system in Block S130. The method S100 further includes, at the computer system, at approximately the first time: receiving a first set of object containers from each sensor block in the set of sensor blocks including the first object container in Block S132; and distributing the first set of object containers to the set of sensor blocks in Block S134. The method S100 also includes, at a second sensor block at a second time: accessing a second frame captured by the camera arranged in the sensor block in Block S110; detecting a second object in the second frame in Block S112; extracting a second location and a second set of features of the second object from the second frame in Block S114; transforming the second set of features into a second set of hash values according to the object hash function in Block S116; and querying the first set of object containers for the second set of hash values in Block S120. The method S100 further includes, in response to each object container in the first set of object containers, excluding a threshold quantity of hash values in the second set of hash values: identifying the second object as entering the imaged space between the first time and the second time; storing the second set of hash values in a second object container in Block S118; and transmitting the second object container and the second location of the second object labeled with the second time to the computer system in Block S130. The method S100 also includes, at the computer system at approximately the second time: receiving a second set of object containers from each sensor block in the set of sensor blocks including the second object container in Block S132; distributing the first set of object containers and the second set of object containers to the set of sensor blocks in Block S134; and generating a first anonymized trajectory of the first object based on the first object container and a second anonymized trajectory of the second object based on the second object container in Block S150.

1.1 Method: Local Collision Control

As shown in FIGS. 4A and 4B, one variation of the method S100 includes, during a first time period, at each sensor block in a first set of sensor blocks deployed within the space: accessing a first frame captured by a camera arranged in the sensor block in Block S110; in response to detecting a first human in the first frame in Block S112, extracting a first set of features representing the first human from the first frame in Block S114 and representing the first set of features in a first object container, in a first set of object containers corresponding to the first time period, the first object container defining a first feature length in Block S118; characterizing a first quantity of collisions between object containers in the first set of object containers in Block S140; accessing a first characteristic of the space in Block S142; accessing a first target quantity of collisions between object containers in the first set of object containers based on the first characteristic in Block S144; and, in response to the first target quantity of collisions exceeding the first quantity of collisions, defining a second feature length less than the first feature length in Block S146 and updating the first object container, in the first set of object containers corresponding to the first time period, the first object containers defining the second feature length; and offloading the first set of object containers to a computer system. The method S100 also includes during a second time period, at each sensor block in the first set of sensor blocks: accessing a second frame captured by the camera arranged in the sensor block in Block S110; in response to detecting a second human in the second frame in Block S112, extracting a second set of features representing the second human from the second frame in Block S114; and representing the second set of features in a second object container, in a second set of object containers corresponding to the second time period, the second object container defining the second feature length in Block S118.

As shown in FIGS. 4A and 4B, one variation of the method S100 includes during a first time period, at each sensor block in a first set of sensor blocks deployed within the space: accessing a first frame captured by a camera arranged in the sensor block in Block S110; in response to detecting a first human in the first frame in Block S112, extracting a first set of features representing the first human from the first frame according to a first object feature model in Block S114, compressing the first set of features into a first hash value within a hash value range based on an object hash function in Block S116 and storing the first hash value in a first object container, in a first set of object containers corresponding to the first time period in Block S118; characterizing a first quantity of collisions between object containers in the first set of object containers in Block S140; accessing a first characteristic of the space in Block S142; accessing a target quantity of collisions between object containers in the first set of object containers based on the first characteristic, the target quantity of collisions corresponding to a minimum privacy threshold for tracking humans within the space in Block S144; and, in response to the target quantity of collisions exceeding the first quantity of collisions, updating the object hash function to define a second hash value greater than the first hash value within the hash value range in Block S148. The method S100 further includes, during a second time period, at each sensor block in the first set of sensor blocks: accessing a second frame captured by the camera arranged in the sensor block in Block S110; in response to detecting a second human in the second frame in Block S112, extracting a second set of features representing the second human from the second frame according to a second object feature model in Block S114; compressing the second quantity of features into the second hash value within the hash value range based on the updated object hash function in Block S116; and storing the second hash value in a second object container, in a second set of object containers corresponding to the second time period in Block S118.

As shown in FIGS. 4A and 4B, one variation of the method S100 includes, during a first time period, at each sensor block in a first set of sensor blocks deployed within the space: accessing a first frame captured by a camera arranged in the sensor block in Block S110; in response to detecting a first human in the first frame in Block S112, extracting a first location and a first set of features representing the first human from the first frame in Block S114, and storing the first location and the first set of features in a first object container, in a first set of object containers corresponding to the first time period, the first object container defining a first feature length in Block S118; characterizing a first quantity of collisions between object containers in the first set of object containers in Block S140; accessing a first characteristic of the space in Block S142; defining a target quantity of collisions between object containers in the first set of object containers based on the first characteristic, the target quantity of collisions corresponding to a minimum privacy threshold for tracking humans within the space in Block S144; and, in response to the target quantity of collisions exceeding the first quantity of collisions, defining a second feature length less than the first feature length in Block S146. The method S100 further includes during a second time period, at each sensor block in the first set of sensor blocks: accessing a second frame captured by the camera arranged in the sensor block in Block S110; and, in response to detecting a second human in the second frame in Block S112, extracting a second location and a second set of features representing the second human from the second frame in Block S114, and storing the second location and the second set of features in a second object container, in a second set of object containers corresponding to the second time period, the second object container defining the second feature length in Block S118.

Figure 5:
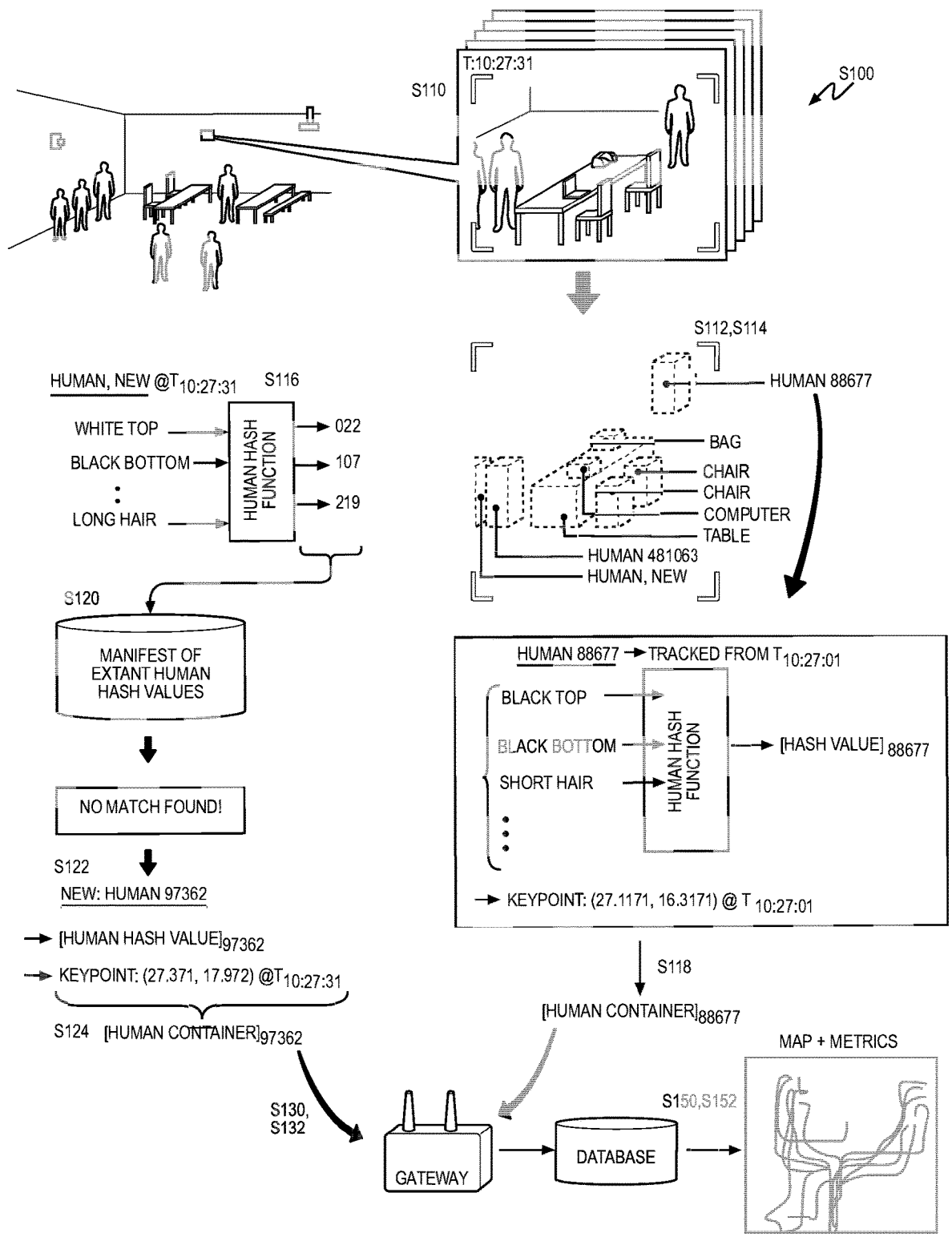
FIG. 5 is a flowchart representation of one variation of the method.

As shown in FIG. 5, one variation of the method S100 includes: accessing a first frame captured by a camera arranged in a sensor block located in the space at a first time in Block S110; detecting a first object in the first frame in Block S112; extracting a first location and a first set of characteristics of the first object from the first frame in Block S114; writing the first set of characteristics to a first object hash value based on an object hash function in Block S116; storing the first location, labeled with the first time, and the first hash value in a first object container in Block S118; accessing a second frame captured by the camera arranged in the sensor block at a second time succeeding the first time in Block S110; detecting a second object in the second frame in Block S112; extracting a second location and a second set of characteristics of the second object from the second frame in Block S114; querying a set of extant object hash values for the second set of characteristics in Block S120; and, in response to identifying a second object hash value, associated with a second object container, that contains the second set of characteristics, writing the second set of characteristics to the second object hash value based on the object hash function in Block S122 and storing the second location, labeled with the second time, in the second object container in Block S118. The method S100 can further include: tracking the first object from the first frame to the second frame; extracting a third location and a third set of characteristics of the first object from the second frame in Block S114; writing the third set of characteristics to the first object hash value based on the object hash function in Block S116; and storing the third location, labeled with the second time, in the first object container in Block S118. The method S100 can also include: reconstructing a first anonymized trajectory of the first object from locations and times stored in the first object container in Block S150; and deriving a statistic of a constellation of objects moving within the space based on the first anonymized trajectory in Block S152.

1.2 Method: Remote Collision Control

One variation of the method S100 includes: during a setup period at a computer system: setting an initial feature length; and distributing the initial feature length to a set of sensor blocks deployed within the space. The method S100 further includes, during a first time period, at each sensor block in the first set of sensor blocks deployed within the space accessing a first frame captured by a camera arranged in the sensor block. The method S100 also includes in response to detecting a first human in the first frame: extracting a first set of features representing the first human from the first frame; representing the first set of features in a first object container, in a first set of object containers corresponding to the first time period, the first object container defining the initial feature length; and offloading the first set of object containers to the computer system. The method S100 also includes, during a second time period, at the computer system: receiving the first set of object containers from each sensor block in the first set of sensor blocks; detecting a first quantity of collisions between object containers in the first set of object containers; deriving a target quantity of collisions between object containers in the first set of object containers based on a first characteristic of the space represented in the first set of object containers; and, in response to the target quantity of collisions exceeding the first quantity of collisions, defining a first feature length less than the initial feature length and distributing the first feature length to the first set of sensor blocks. The method S100 further includes, during a third time period, at each sensor block in the first set of sensor blocks: accessing a second frame captured by the camera arranged in the sensor block; in response to detecting a second human in the second frame, extracting a second set of features representing the second human from the second frame; representing the second set of features in a second object container, in a second set of object containers corresponding to the third time period, the second object container defining the first feature length; and offloading the second set of object containers to the computer system.

2. Applications

Generally, Blocks of the method S100 can be executed by a sensor block and/or a gateway within a network of sensor blocks arranged throughout a space (e.g., an office, an airport, a mall): to track movements of unique—but anonymous—humans moving through the space; to track unique—but genericized—objects moving through the space; and to derive metrics for human and object motion through the space (e.g., true occupancy count) and use of the space based on unique, anonymous, and genericized human and object trajectories, thereby enabling a user to achieve and maintain awareness of object flow, human flow, and true occupancy count in the space with no or minimal exposure of identifying employee (or "worker") information to the user or other entity.

The method S100 is described herein as executed by each sensor block—in a (mesh) network of sensor blocks to: capture a sequence of frames depicting a region of the space; detect humans in these frames; store identifying human information in human hash values specific to individual humans detected in these frames; identify a human detected in a current frame as the same unique, anonymous human detected in a previous frame by querying past human hash values for characteristics of the human detected in the current frame; and store locations of unique, anonymous humans detected in these frames. The sensor block can execute similar methods and techniques to: detect objects in these frames; store identifying object information in object hash values specific to individual objects detected in these frames; identify an object detected in a current frame as the same object (or instance of the same object type) detected in a previous frame by querying past object hash values for characteristics of the object detected in the current frame; and store locations of unique objects (and/or unique instances of the same object type) detected in these frames.

The sensor blocks can return these human and object hash values to a gateway (i.e., rather than raw or processed frames), and the gateway can update these data to a database. A remote computer system can then access and process these data to derive statistics for motion of humans and objects through the space and metrics of the space over time.

Alternatively, the sensor blocks can return these human and object hash values to the computer system to generate an object hash manifest. The computer system can then distribute the object hash manifest to the network of sensor blocks and process these data to derive statistics for motion of humans and objects through the space (e.g., anonymized object trajectories), total human count (or "true occupancy count"), and metrics of the space over time.

Furthermore, the network of sensor blocks can: characterize collisions between object containers; define a target quantity of collisions based on a characteristic of the space such as human count, location, average velocity of humans, and/or time of day; and adjust features and/or object hash values stored in these object containers to achieve a minimum privacy threshold or a maximum privacy threshold corresponding to the characteristic of the space.

However, the network of sensor blocks can alternatively transmit original frames to the gateway, and the gateway (or the remote computer system) can execute Blocks of the method S100 to generate human and object hash values and human and object containers before discarding these frames.

2.1 Sensor Block and Gateway

Generally, Blocks of the method S100 can be executed by a sensor block and/or a gateway. As described in U.S. patent application Ser. Nos. 17/152,685 and 17/138,784, which are incorporated in their entireties by this reference, a sensor block can include: an optical sensor (hereinafter a camera); a motion sensor; a battery; a local processor that locally executes Blocks of the method S100; and a wireless communication module that wirelessly connects to other sensor blocks in a network of sensor blocks and/or to the gateway. Additionally or alternatively, the sensor block can be connected to the gateway via a wired data connection and/or can be powered via a wired power connection.

3. Frame Capture

Once a sensor block is installed (or "deployed") within a space, the sensor block can intermittently trigger the camera to capture discrete frames or video clips. For example, the sensor block can capture a sequence of 20 frames at a frame rate of 2 Hz (i.e., over 10 seconds) or 0.2 Hz (e.g., over 100 seconds): at the earlier of detecting motion within the field of view of the camera (e.g., via a motion sensor in the sensor block) and passage of ten minutes since a last sequence of frames captured by the sensor block; and with no less than two minutes between capture of consecutive sequences of frames.

However, the sensor block can capture frames at any other frame rate, responsive to any other event, and with any other minimum or maximum times between consecutive sequences of frames.

4. First Frame

Blocks S110, S112, S114, S116, and S118 of the method S100 recite: accessing a first frame captured by a camera arranged in a sensor block located in the space at a first time; detecting a first object in the first frame; extracting a first location and a first set of characteristics of the first object from the first frame; writing the first set of characteristics to a first object hash value based on an object hash function; and storing the first location, labeled with the first time, and the first hash value in a first object container.

Generally, once the sensor block captures a first frame in a sequence of frames (e.g., at the start of a new time interval, such as at the start of a workday), the sensor block can implement object detection techniques to detect a constellation of objects (e.g., inanimate object and humans) in the first frame.

4.1 First Inanimate Object: Location

In one implementation, upon detecting a first object in the first frame, the sensor block extracts a first location of the first object from the first frame. For example, for a 2D frame, the sensor block can implement blob and/or edge detection techniques to detect a contiguous cluster of 2D pixels representing the first object; and derive an (x,y) pixel location—within a coordinate system of the sensor block—of the 2D centroid of this "blob" of pixels that depicts the first object in the first frame.

The sensor block can also extract a first orientation of the first object from the first frame. For example, the sensor block can implement template matching techniques to identify a type of the first object, including: accessing multiple templates of each of multiple predefined object types, wherein each template image is labeled with an object orientation; and derive the orientation of the first object based on an orientation stored in a template matched to the first object. In another example, the sensor block implements artificial intelligence techniques and a perception model trained on images of objects labeled with orientations to both: identify a type of the object; and derive an orientation of the object within the coordinate system of the sensor block.

However, the sensor block can implement any other method or technique to extract the location and/or orientation of the first object from the first frame.

4.1.2 First Object: Type and Characteristics

Generally, the computer system can generate an object feature model during a setup period. For example, the computer system can: access an initial sequence of frames from a network of sensor blocks deployed in the space; detect a corpus of objects in the sequence of frames; extract an initial set of locations of each object in the corpus of objects from the initial sequence of frames; and access a table of characteristic values defining an object type in a set of object types of the corpus of objects, a maximum and a minimum width of each frame in the initial sequence of frames, and a range of colors representing presence of pixels in of each frame in the initial sequence of frames. The computer system can then: correlate each object in the corpus of objects with a characteristic value in the table of characteristic values to generate an object feature model; and distribute the object feature model to the network of sensor blocks in the space.

Furthermore, upon detecting a first object in the first frame, the sensor block detects a type of the first object and extracts characteristics of the first object from first frame.

In one implementation, the sensor block receives the object feature model from the computer system and stores a local copy of this object feature model—shared and implemented by all sensor blocks in the sensor block network—trained to detect present, absence, and/or magnitude of visual characteristics of inanimate (i.e., non-human) objects depicted in an image and to return corresponding values. For example, upon receipt of a region of the first frame depicting the first object, the object feature model can return values for: a nearest approximation of the type of the first object selected from: a chair, a bag, a desk, a jacket, a laptop, a coffee mug, etc.; a ratio of maximum width to minimum width within a first ratio range; a ratio of maximum width to minimum width within a second ratio range; a ratio of maximum width to minimum width within a third ratio range; presence of pixels within a first color range (e.g., "red"); presence of pixels within a second color range (e.g., "green"); presence of pixels within a third color range (e.g., "blue"); presence of pixels within a fourth color range (e.g., "black"); presence of pixels within a fifth color range (e.g., "white"); and/or other presence of other characteristics or ranges of other characteristics. In particular, the sensor block can apply this object feature model to a region of the first frame depicting the first object: to detect or characterize features in this region of the first frame; and to generate a set of values representing the type and characteristics of the first object.

The sensor block can then: retrieve a cryptographic hash function for objects—identical to cryptographic hash functions implemented by other sensor blocks in the network—from local memory; and implement the cryptographic hash function to transform values representing characteristics (and the type) of the first object into a first object hash value. Alternatively, the computer system can: receive a first set of object containers from each sensor block deployed in the space; and apply the cryptographic hash function to the first set of object containers to represent the first set of object containers in an unreadable format. Thus, the first object hash value can represent a type and/or characteristics of the first object in a format that is practically infeasible to invert or reverse to uniquely identify the object.

The computer system can receive a query for a subset of hash values from a user portal; and query the first set of object containers for the subset of hash values according to a privacy filter (e.g., statistical data structure, Bloom filter). Then, in response to an object container, in the first set of object containers, containing the subset of hash values, the computer system can: generate a notification correlating the first object to the subset of hash values; and render the notification within the user portal for an administrator affiliated with the space to review.

4.1.3 First Object: Container

The sensor block can then: initialize a first object container for the first object; store the first object hash value in the first object container; and write a first keypoint—containing the first location and/or the first orientation of the first object derived from the first frame, a timestamp of the first frame, and an identifier of the sensor block—to the first object container.

4.2 Other Objects

The sensor block can execute the foregoing process for each other object detected in the first frame to generate a set of object containers, each representing a unique object in the field of view of the sensor block at the first time.

4.3 First Human

The sensor block can implement similar methods and techniques to detect a human in the first frame and to generate a first human container that uniquely represents the human—but excludes or obfuscates information to uniquely identify the human—and the location of the human in the field of view of the sensor block at the first time.

In particular, upon receipt of the first frame, the sensor block: detects a first human in the first frame; implements methods and techniques described above to derive a location and orientation of the first human in the first frame; extracts characteristics of the first human from the first frame; and maps these characteristics of the first human to a first human hash value according to a cryptographic hash function for humans; and compiles these data into a first human container.

4.3.1 First Human: Facial Features

In one implementation, the sensor block implements face detection techniques to detect a first face in a first region of the first frame. The sensor block then accesses a local copy of a facial feature model—shared and implemented by all sensor blocks in the sensor block network—trained to detect present, absence, and/or magnitude of target facial features of humans detected in an image and to return corresponding face values. For example, upon receipt of a region of the first frame depicting the first human, the facial feature model can return values for: presence of thin eyebrows; presence of thick eyebrows; presence of brown eyes; presence of blue eyes; presence of red hair; presence of blonde hair; presence of brown hair; presence of long hair; presence of short hair; presence of covered hair; presence of glasses; presence of lipstick; a Fitzpatrick skin color classification; and/or a face shape (e.g., round, oval, square); etc. In particular, the sensor block can apply this facial feature model to a region of the first frame depicting the first human: to detect or characterize facial features in this region of the first frame; and to generate a set of values representing the facial characteristics of the first human.

The sensor block can then: retrieve a cryptographic hash function for humans—identical to cryptographic hash functions implemented by other sensor blocks in the network—from local memory; and implement the cryptographic hash function to transform values representing facial characteristics of the first human into a first human hash value.

Thus, the first human hash value can represent facial characteristics of the first human in a format that is practically infeasible to invert or reverse to uniquely identify the human.

4.3.2 First Human: Body Features

In one variation, the sensor block additionally or alternatively: implements body detection techniques to detect a first human body (e.g., adjacent the first face) in the first region of the first frame; implements a human body feature model to detect features in the region of the first frame depicting the first human body and to generate a set of values representing presence and characteristics of the first human body; and implements the cryptographic hash function for humans to store these human body values in the first hash value for the first human.

4.3.3 First Human: Location and Orientation

The sensor block can also implement methods and techniques similar to those described above to derive a first location and a first orientation of the first human—within the coordinate system of the sensor block—from the first frame. For example, the sensor block can: detect a first human in the first frame; calculate a first location of the first human based on a centroid of pixels representing the first face in the first frame; calculate a first orientation of the first human based on a vector parallel to a ground plane and normal to the first face (e.g., normal to a line connecting two eyes of the face detected in the first frame) in the first frame.

4.3.4 First Human: First Keypoint

The sensor block can then: initialize a first human container for the human; store the first human hash value in the first human container; and write a first keypoint—containing the first location and/or the first orientation of the first human derived from the first frame, a timestamp of the first frame, and an identifier of the sensor block—to the first human container.

4.4 Other Humans

The sensor block can execute the foregoing process for each other human detected in the first frame to generate a set of human containers, each representing a unique human in the field of view of the sensor block at the first time.

5. Second Frame

The sensor block can then implement similar methods and techniques for a second frame in the sequence of frames captured by the sensor block.

Generally, once the sensor block captures a second frame, the sensor block can: implement object detection techniques to detect a constellation of objects in the second frame; implement object tracking techniques to track static and moving objects and humans from the first frame to the second frame; isolate a first subset of objects present in and tracked from the first frame to the second frame; and update object containers for this first subset of objects to reflect new locations and orientations of these objects and additional features or characteristics of these objects derived from the second frame, which may depict these objects in a different perspective than the first frame. Similarly, the sensor block can isolate a first subset of humans present in and tracked from the first frame to the second frame; update human containers for this first subset of humans to reflect new locations and orientations of these humans and additional characteristics of these humans derived from the second frame, which may depict these humans in a different perspective than the first frame.

The sensor block can also isolate a second subset of new objects not present in the first frame but present in the second frame (i.e., objects that entered the field of view of the sensor block between capture of the first frame and capture of the second frame. For each new object in this second subset, the sensor block can check stored object hash values—generated within the current time interval (e.g., the current workday) by the same and/or other sensor blocks—for a similar or identical combination of characteristics. If the sensor block identifies another object hash value that matches (i.e., contains most or all of) the characteristics of a new object detected in the second frame, the sensor block can: correlate (or link, associate, identify) the new object with a previously-detected object represented by an existing object container associated with the matched object hash value; write characteristics of the new object to this matched object hash value; and write a keypoint for the second time and the location of the new object to this object container. Conversely, if the sensor block fails to identify an existing object hash value that contains most or all of the characteristics of the new object, the sensor block can: identify the object as previously undetected during the current time interval; and implement methods and techniques described above to generate a new object container for the new object.

Similarly, the sensor block can isolate a second subset of new humans not present in the first frame but present in the second frame (i.e., humans that entered the field of view of the sensor block between capture of the first frame and capture of the second frame). For each new human in this second subset, the sensor block can check stored human hash values—generated within the current time interval by the same and/or other sensor blocks—for a similar or identical combination of facial and/or body characteristics. If the sensor block identifies another human hash value that matches (i.e., contains most or all of) the characteristics of a new human detected in the second frame, the sensor block can: correlate (or link, associate, identify) this new human with a previously-detected human represented by an existing human container associated with the matched human hash value; write characteristics of the new human to this matched human hash value; and write a keypoint for the second time and the location of the new human to this human container.

Conversely, if the sensor block fails to identify an existing human hash value that contains most or all of the facial and/or body characteristics of the new human, the sensor block can: identify the human as previously undetected during the current time interval; and implement methods and techniques described above to generate a new human container for the new human.

5.1 First Object Tracked to Second Frame

In one example, the sensor block can detect and track a first object from the first frame to the second frame.

5.1.1 First Object: Second Location and Orientation

In this example, the sensor block can implement methods and techniques described above to: confirm the type of the first object; extract a second location of the first object in the second frame; and derive a second orientation of the first object in the second frame.

5.1.2 First Object: Revised Characteristics

In this example, if the second location of the first object differs from the first location of the first object, the first object may be moving, and the first object may be represented in different perspectives in the first and second frames. Therefore, the sensor block can extract a second set of visual characteristics of the first object from the second frame and write these visual characteristics to the first object hash value.

In one implementation, the sensor block: implements the object feature model described above to detect features in the region of the second frame depicting the first object and to generate a second set of values representing the type and characteristics of the first object as represented in the second frame; and implements the cryptographic hash function to store these values in the first object hash value—stored in the first object container—for the first object. More specifically, because the sensor block stores characteristics of the first object in a hash value, the first object hash value represents a union of the features of the first object detected in the first and second frames. Thus, if the sensor block detects the same features or a subset of the same features of the first object in the second frame as the first frame, the first object hash value remains unchanged when the sensor block writes the second set of characteristics to the first object hash value according to the object hash function.

However, if the sensor block detects additional features of the first object in the second frame (e.g., due to movement of the first object in the field of view of the sensor block), the first object hash value remains the same length (or size), but changes in value to represent the sum of all characteristics of the first object detected in the first and second frames when the sensor block writes the second set of characteristics to the first object hash value according to the object hash function.

For example, the sensor block can implement Blocks of the method S100, at a first time, to store the first set of hash values in the first object container, the first object container defining a first feature length (e.g., size). At a second time, the sensor block can identify the first object in a second location different than the first location. Then, the sensor block can: generate an updated first object container, the updated first object container defining the first feature length (e.g., size); and transmit the updated first object container and the second location of the first object labeled with the second time to the computer system. More specifically, in response to detecting motion in a field of view of the camera arranged in the sensor block, the sensor block can: detect the second object in the second frame; extract a velocity, the second location, and the second set of features of the second object from the second frame; and generate the updated first object container representing a combination of the first set of features detected in the first frame and the second set of features of the first object detected in the second frame and defining the first feature length.

Thus, the sensor block can maintain the feature length (e.g., size) of the object container and update the hash values of the object container to represent the first set of features and the second set of features of the first object, thereby increasing the feature specificity of the object.

5.1.3 First Object: Second Keypoint

The sensor block can also implement methods and techniques described above to write a second keypoint—containing the second location and/or the second orientation of the first object derived from the second frame, a timestamp of the second frame, and an identifier of the sensor block—to the first object container.

5.2 First Human Tracked to Second Frame

Similarly, the sensor block can detect and track a first human from the first frame to the second frame. The sensor block can then implement similar methods and techniques to update the human hash value for the first human, to generate a second keypoint for the first human, and to store these data in the first human container.

5.3 New Object: Second Keypoint

The sensor block can also detect a new, second object present in the second frame but not detected in or tracked from the first frame.

5.3.1 New Object: Type and Characteristics

In this implementation, the sensor block can implement methods and techniques described above to detect a type of the second object and to extract characteristics of the second object from the second frame. For example, the sensor block can implement the object feature model described above to detect features in the region of the second frame depicting the second object and to generate a second set of values representing the type and characteristics of the second object.

5.3.2 Second Object: Correlation to Past Object

The sensor block can then: access a manifest of object hash values generated by the sensor block, other sensor blocks in the network of sensor blocks, and/or the gateway and representing objects detected in the space within the current time interval (e.g., the past 24 hours, the work day); and query the manifest for object hash values that contain values representative of the type and characteristics of the second object.

If the manifest returns a particular object hash value that contains most or all (e.g., more than 95%) of the second set of values representing the type and characteristics of the second object, the sensor block can identify the second object as the same object (or an instance of the same object type, such as an office-issued coffee mug, computer, or chair) as represented by the particular object hash. Accordingly, the sensor block can retrieve a particular object container containing the particular object value hash; implement the cryptographic hash function to store the second set of values in the particular object hash value; derive a location and an orientation of the second object from the second frame; and write a second keypoint—containing the location and/or the orientation of the second object derived from the second frame, a timestamp of the second frame, and an identifier of the sensor block—to the particular object container.

Conversely, if the manifest of object hash values returns no particular object hash value that contains most or all of the second set of values representing the type and characteristics of the second object, the sensor block can: identify the second object as a new object; implement the object hash function to generate an object hash value for the new object based on the type and/or characteristics of the new object; initialize a new object container for this new object; store the object hash value in the new object container; and write a keypoint—containing the location and/or the orientation of the new object derived from the second frame, a timestamp of the second frame, and an identifier of the sensor block—to the new object container.

5.4 New Human

The sensor block can implement similar methods and techniques in response to detecting a new human in the second frame.

5.5 Hash Value Manifest

In one implementation in which each sensor block independently executes the foregoing Blocks of the method S100 and in which these sensor blocks are networked (e.g., connected in a mesh network) within the space, each sensor block can: maintain a local copy of a network-wide manifest (e.g., table, list, chart) of object hash values for all unique objects detected by all sensor blocks within the network within the current time interval; broadcast a new object hash value to all other sensor blocks in the network in response to detecting a new object in its field of view or updating an object hash value of an existing object; update object hash values within its local copy of the manifest in response to receiving new or updated object hash values from other sensor blocks in the network; and clear object hash values older than (or not updated within) the predefined time interval.

In another implementation, each sensor block can broadcast original frames or compressed frames (e.g., list of detected object types, locations, and characteristics) to the gateway, which then executes the foregoing methods and techniques to generate object containers representing time-series locations and orientations of unique objects detected throughout the space over time. In this implementation, the gateway maintains an object hash manifest containing one current object hash value for each unique object detected in the original frames received from all sensor blocks in the network within the predefined time interval.

In yet another implementation, the computer system can similarly maintain and update a manifest of object hash values and distribute the manifest to all sensor blocks deployed in the space. For example, during a first time period, the computer system can: receive a first set of object containers from each sensor block deployed in the space including a first object container corresponding to the first object; generate an object hash manifest defining an object hash table including the first set of object containers; and distribute (or "transmit") the object hash manifest to the network of sensor blocks. Later, during a second time period, the computer system can: receive a second set of object containers from each sensor block deployed in the space including a second object container corresponding to a second object; combine the first set of object containers and the second set of object containers into the object hash table to update the object hash manifest; and transmit the updated object hash manifest to the network of sensor blocks.

The sensor block, gateway, and/or computer system can similarly maintain and update a manifest of human hash values.

5.6 Low v. High Frame Rate

Generally, the sensor block (and/or the gateway) can execute the foregoing process to generate and update object and human containers based on frames captured by the sensor block at low and/or high frame rates.

For example, for a low frame rate (e.g., one frame per ten-second or ten-minute interval), the sensor block can access a first frame captured at the start of a current time interval (e.g., the beginning of a work day); initialize containers and hash values for objects and humans detected in the first frame; and then access a next frame (e.g., captured by the sensor block between ten seconds and ten minutes later). In this example, high latency between consecutive images may prevent effective object tracking between images. Therefore, the sensor block can: query extant object and human hash values for the current time interval (e.g., the current date) for characteristics of additional objects and humans detected in the second frame but not the first frame; initialize new containers and hash values for a first subset of objects and humans detected in the second frame but not matched to extant object and human hash values stored in current object and human containers; and update extant object and human hash values based on features of a second subset of objects and humans a) detected in the second frame, b) not detected in the first frame, and c) matched to extant object and human hash values stored in current object and human containers. The sensor block can repeat this process for each subsequent frame until the conclusion of the current interval (e.g., the current work day).

In another example in which the sensor block captures frames at a high frame rate (e.g., at least two frames per second, or 2 Hz), the sensor block can: access a first frame captured at the start of a current time interval (e.g., the beginning of a work day); initialize new containers and hash values for objects and humans detected in the first frame; access a next frame (e.g., captured by the sensor block between ten and 500 milliseconds later); implement object tracking techniques to track objects and humans from the first frame to the second frame; update object and human hash values for objects and humans detected in the first frame based on features detected in the second frame; and query extant object and human hash values for the current time interval (e.g., the current date) for characteristics of additional objects and humans detected in the second frame but not the first frame. The sensor block can then selectively: a) initialize new containers and hash values for objects and humans detected in the second frame but not matched to extant object and human hash values stored in current object and human containers b) or update extant object and human hash values based on features of these additional objects and humans detected in the second frame but not the first frame. The sensor block can repeat this process for each subsequent frame captured by the sensor block.

In one variation, the sensor block: detects an object in a first frame; and tracks the object over a subsequent sequence of frames. Upon detecting absence of the object in a next frame(s), the sensor block implements the foregoing methods and techniques to: identify the type of the object; extract a sequence of keypoints of the object from the sequence of frames depicting the object; extract characteristics of the object from the sequence of frames depicting the object; and query extant object and human hash values for the current time interval (e.g., the current date) for characteristics of the object. If the sensor block identifies a particular object hash value that contains most or all of the characteristics of the object, the sensor block can: identify the object as the same object (or another instance of the same object type) represented in the object hash value; retrieve the corresponding object container; write the characteristics of the object to the particular object hash value in the corresponding object container; and write the sequence of keypoints to the corresponding object container. Otherwise, the sensor block can: initialize a new object container for this object; store the characteristics of the object—extracted from the sequence of frames—in an object hash value; and store the object hash value, the sequence of keypoints, and a time of the sequence of frames in the new object container. The sensor block can then upload the new or updated object container to the gateway and/or add the object hash value to an object manifest distributed across the network of sensor blocks. The sensor block can repeat this process for other objects and implement similar processes for humans detected in one frame or detected and tracked across multiple frames.

6. Object and Human Container Offloading

In one implementation, the sensor block: captures a frame; executes the foregoing methods to process the frame; transmits new object container and/or object hash update and keypoint pairs to the gateway soon (e.g., immediately) after processing the frame; and repeats the process for each subsequent frame captured by the sensor block.

In another implementation, the sensor block: captures a frame; generates an object hash value, a first keypoint, and an object container for a new object detected in this frame; tracks this object over subsequent frames; and updates the object hash value for this object and writes additional keypoints to this object container based on features detected in these subsequent frames. The sensor block then transmits a completed object container for this object to the gateway at the earlier of: a maximum time interval between reporting on individual objects in the field of view of the sensor block (e.g., ten minutes, one hour); and detecting absence of the object in a subsequent frame captured by the sensor block (i.e., the object moved out of the field of view of the sensor block).

In the foregoing implementations, the gateway can then: ingest object containers, updated object hash values, and/or additional keypoints broadcast by the network of sensor blocks; write these data to a (remote) database; and publish and/or push updated manifests of object hash values to the network of sensor blocks, as described above.

The sensor blocks and the gateway can similarly generate, update, store, and handle human containers and human hash values.

More specifically, over time, the network of sensor blocks can generate, update, and return a corpus of object and human containers to the gateway, which stores these object and human containers in the database.

Alternatively, over time, the network of sensor blocks can return raw or processed frames to the gateway. The gateway can then locally execute the foregoing processes to: generate and update a corpus of object and human containers based on features detected in these frames; and store these object and human containers in the database.

7. Human Telemetry

Block S130 of the method S100 recites reconstructing a first anonymized trajectory of the first object from locations and times stored in the first object container; and Block S132 of the method S100 recites deriving a statistic of a constellation of objects moving within the space based on the first anonymized trajectory. Generally, in Blocks S130 and S132, a remote computer system can compile a corpus of human containers into trajectories of unique—but anonymous—humans moving through the space during a time interval represented by the corpus of human containers.

In particular, each human container in the database contains: a human hash value that (uniquely) represents a human; a human label; and a set of keypoints, each specifying a) a particular time, b) a unique identifier of a particular sensor block that detected the human at the timestamp, and c) a location and/or orientation of the human relative to (e.g., in the field of view) the particular sensor block at the particular time. Therefore, in one implementation, the remote computer system: accesses a map, list, etc. representing locations and orientations of sensor blocks—in the network—within a global coordinate system of the space; selects a first human container from the database; converts relative locations and/or orientations of a first human—represented in keypoints in the first human container—into global locations and/or orientations of the first human within the global coordinate system of the space; and orders these global locations and/or orientations of the first human by timestamp to generate a first trajectory of the first human during the time interval. More specifically, the remote computer system can compile keypoints (i.e., times and relative locations) stored in the first human container and known locations of sensor blocks throughout the space to generate a first trajectory of a first unique—but anonymous—human moving throughout the space during the time interval.

The remote computer system can repeat this process based on other human containers generated during the time interval to calculate trajectories of all unique—but anonymous—humans moving throughout the space during the time interval.

8. Object Telemetry

The remote computer system can similarly compile a corpus of object containers into trajectories of unique (or identical) objects moving through the space during the time interval.

Generally, each object container contains: an object hash value that (uniquely) represents an object (or an object type); an object type label; and a set of keypoints, each specifying a) a timestamp, b) a unique identifier of a particular sensor block that detected the object at the timestamp, and c) a location and/or orientation of the object relative to the particular sensor block (e.g., in the field of view of the sensor block) at the time stamp. Therefore, in one implementation, the remote computer system: selects a first object container; converts relative locations and/or orientations of a first object—represented in keypoints in the first object container—into global locations and/or orientations of the first object within the global coordinate system of the space; orders these global locations and/or orientations of the first object by timestamp to generate a first trajectory of the first object during the time interval; and labels the first trajectory of the first object with the type of the first object contained in the first object container. More specifically, the remote computer system can compile keypoints (i.e., times and relative locations) stored in the first object container and known locations of sensor blocks throughout the space to generate a first trajectory of a first object—of known or predicted type—present in and/or moving throughout the space during the time interval.

The remote computer system can repeat this process based on other object containers generated during the time interval to calculate trajectories of all unique—but anonymous—objects moving throughout the space during the time interval, further described below.

8.1 Other Object Telemetry

In one variation, the sensor block can detect a second object in the second frame and query the first set of object containers and/or the hash manifest for hash values corresponding to the second object. The sensor block can then identify the second object as previously detected as the first object, previously detected as a second object by another sensor block deployed in the space, as an undetected object (e.g., new object), and/or as entering the imaged space between two frames captured by two sensor blocks in the space.

Accordingly, the sensor block can update the object container with revised characteristics, store a second set of hash values corresponding to the second object into a second object container, and/or offload this identification of the second object to the computer system to generate anonymized trajectories of objects.

In one example, the sensor block can: access a second frame captured by the camera arranged in the sensor block; detect a second object in the second frame; extract a second location and a second set of features of the second object from the second frame; transform the second set of features into a second set of hash values according to the object feature model; and query a first set of object containers—generated by the network of sensor blocks deployed in the space—for the second set of hash values. Then, in response to a second object container, in the first set of object containers, containing a threshold quantity of hash values in the second set of hash values, the sensor block can: identify the second object as the first object previously detected by a first sensor block and represented by the first object container; write the second set of hash values (e.g., revised features of the first object) to the first object container to generate an updated first object container; and transmit the updated first object container and the second location of the first object labeled with a timestamp to the computer system to generate an anonymized trajectory of the first object based on the updated first object container.

Additionally or alternatively, in response to the second object container, in the first set of object containers, containing the threshold quantity of hash values in the second set of hash values, the sensor block can: identify the second object as previously detected by a second sensor block deployed in the space and represented by the second object container; and transmit the second location of the second object labeled with the timestamp to the computer system.

In another example, the sensor block can: access the second frame captured by the camera arranged in the sensor block; detect the second object in the second frame; extract the second location and the second set of features of the second object from the second frame; transform the second set of features into the second set of hash values according to the object feature model; and query a first set of object containers—generated by the network of sensor blocks deployed in the space—for the second set of hash values. Then, in response to a second object container, in the first set of object containers, excluding a threshold quantity of hash values in the second set of hash values, the sensor block can: identify the second object as undetected (e.g., new object) at a previous time; store the second set of hash values in a third object container; and transmit the third object container and the second location of the second object labeled with the timestamp to the computer system to generate a second anonymized trajectory of the second object based on the third object container.

Furthermore, in this variation, the computer system can receive a first set of object containers from the network of sensor blocks during a first time period, and generate the object hash manifest, described above, defining a hash table including the first set of object containers. The computer system can then distribute the object hash manifest to all sensor blocks deployed in the space and the sensor block can query the object hash manifest for the second set of hash values to identify the second object as previously detected as the first object, previously detected as a second object by another sensor block deployed in the space, and/or as an undetected object (e.g., new object).

Alternatively, the sensor block can implement similar methods and techniques to identify the second object as entering the imaged space between a first frame captured by a camera in a first sensor block at a first time and a second frame captured by a second camera in a second sensor block at a second time. The computer system can then: receive a second set of object containers from each sensor block deployed in the space including the third object container; distribute the first set of object containers and the second set of object containers to the set of sensor blocks; and reconstruct an anonymized trajectory of the second object between the first frame and the second frame based on the second object container.

9. Space Use Metrics

The remote computer system can then derive metrics or statistics representing use of the space from these unique, anonymous human trajectories and object trajectories, such as: locations in which humans aggregate in groups of 2 or 3, 4-7, 8-10, and 11+ people; locations of peak human traffic; locations of no or minimal human traffic; movement of chairs throughout office; time that humans spend isolated (e.g., more than six feet from another human) versus time that humans spend in groups of two or more; etc.; histograms of durations of time that each unique but anonymous human spends with each other unique but anonymous human within the space during the time interval; manhours spent in groups of groups of 2 or 3, 4-7, 8-10, and 11+ people in discrete locations (e.g., conference rooms) within the space; and common routes between key locations within the space (e.g., along hallways to inform carpet replacement, between a kitchen and bathroom to inform floor cleaning, between desks and a conference room to inform removal of obstacles and pinch points), etc.

For example, the computer system can derive a statistic representing a route along a common hallway within the space. The sensor block can implement Blocks of the method S100: to extract a first location, corresponding to an entrance of a hallway within the space, and a first set of features of a first object from the first frame; and to extract a second location, corresponding to an exit of the hallway within the space, and a second set of features of a second object from the second frame. The sensor block can then: transform the second set of features into a second set of hash values according to the object feature model; query the first set of object containers for the second set of hash values; and, in response to a second object container, in the first set of object containers, containing a threshold quantity of hash values in the second set of hash values, identify the second object as the first object previously detected by the first sensor block, in the set of sensor blocks, and represented by the first object container. The computer system can then: generate an anonymized trajectory of the first object based on the first object container; and derive a statistic representing a route between the entrance and exit of the hallway, based on the first location of the first object, the second location of the first object, and the anonymized trajectory of the first object.

The remote computer system can then serve these metrics to an office manager or other operator, such as to inform redistribution of work areas throughout an office or reallocation of resources within a space. Additionally or alternatively, the remote computer system can publish these metrics to an office manager, operator, or employee portal to enable employees to identify and avoid noisy areas within an office or find and seek quiet areas within the office.

10. Container Reset

The network of sensor blocks and the gateway can cooperate to execute the foregoing process over time, such as within discrete time intervals. For example, the gateway and/or the sensor blocks can reset object and human containers and restart the foregoing process once per day (e.g., workday), once per shift (e.g., 8 AM to 12 PM, 12 PM to 4 PM), or once per hour, etc.

11. Contextual Privacy

In one variation, the network of sensor blocks and/or the gateway implements contextual controls to selectively (de) activate human tracking features in order to inhibit human identity reconstruction from data captured by the sensor blocks.

11.1 Human Count: Frame Rate

In one implementation, a sensor block captures frames at a frame rate proportional to a quantity of humans detected in a last frame or last sequence of frames captured by the sensor block. For example, if the sensor block detects a first quantity range of humans in the last frame captured by the sensor block, the sensor block can set and implement a delay of a first duration before capturing a next frame. However, if the sensor block detects a second quantity range—greater than the first quantity range—of humans in this last frame, the sensor block can set and implement a delay of a second duration—less than the first duration—before capturing the next frame.

The sensor block can therefore: capture frames at a dynamic or variable frame rate based on quantity of humans detected in last frames captured by the sensor block; and implement methods and techniques described above to track humans in these frames, generate and update human hash values for humans detected in the frames, populate human containers with keypoints and human hash values representing unique—but anonymous—humans detected in these frames, and return these human containers and updates to the gateway.

11.2 Human Detection and Representation Modes

In this variation, a sensor block can additionally or alternatively implement multiple human detection and representation modes, each applied to humans detected in frames captured by the sensor block based on locations of these humans within the space, such as including: a high-resolution image mode in which the sensor block returns raw or high-resolution frames (e.g., of public areas, such as a lobby to support real-time security initiatives) to the gateway; an obscured image mode in which the sensor block returns frames containing blurred or redacted faces (e.g., of group work areas, such as a conference rooms to enable remote monitoring of productivity and to inform conference room cleaning schedules) to the gateway; a human location mode in which the sensor block returns human locations—extracted from frames—exclusively (e.g., for private and personal work areas, such as private offices or agile desk areas); a human counter mode in which the sensor block returns a count (e.g., occupancy count) of humans extracted from frames; and a human hash mode in which the sensor block returns and updates human containers—including human hash values and keypoints as described above—(e.g., for all other locations within the space) to the gateway.

In particular, in this implementation, a sensor block can transition between or selectively execute these human detection and representation modes based on: a type of space or location that falls within the field of view of the sensor block; whether a human is present in the field of view of the sensor block; a quantity of humans in the field of view of the sensor block; motion of humans in the field of view of the sensor block; and time (e.g., time of day). In this variation, the sensor block can also return and update human containers—including human hash values and keypoints as described above for humans moving within its field of view—to the gateway in the high-resolution image and obscured image modes to enable the gateway and/or the remote computer system to continue to track motion of unique—but anonymous—humans within the space.

Alternatively, a sensor block can disable generation of and updates to human containers in the high-resolution image mode and in the obscured image mode in order to prevent an operator from: fusing human containers and frames to identify individual humans represented in human containers; and deriving particular locations within the space occupied by a particular identified human from keypoints contained in a human container. Accordingly, the sensor block (or the gateway, the remote computer system) can extract only human timestamped locations from these high-resolution and blurred frames. The remote computer system can then complete (or "fill in") gaps in and/or connect trajectories of unique but anonymous humans—derived from human containers generated from frames captured by the network of sensor blocks—with these timestamped human locations.

11.2.1 Type of Space or Location: Delineated Sensor Block Fields of View

In one implementation, sensor blocks are arranged within the space such that the edges of their fields of view fall along boundaries between defined areas within the space, such as including: public areas; group work areas; and/or private and personal work areas. Accordingly, each sensor block is assigned a particular human detection and representation mode.

For example: a first set of sensor blocks arranged in a lobby can be configured to operate exclusively or by default in the high-resolution image mode; a second set of sensor blocks arranged in conference rooms can be configured to operate exclusively or by default in the obscured image mode; a third set of sensor blocks arranged in and near private offices and an agile desk area can be configured to operate exclusively or by default in the human location mode; and all other sensor blocks arranged in the space can be configured to operate exclusively or by default in the human hash mode.

11.2.2 Type of Space or Location: Overlapping Sensor Block Fields of View

Alternatively, once the network of sensor blocks is installed in the space and connected to the gateway, the sensor blocks, the gateway, and/or the remote computer system can cooperate to generate a map of fields of view of these sensor blocks, such as described in U.S. patent application Ser. No. 17/316,595. A manager, administrator, or other operator may then annotate this map directly or upload a map of the space annotated with locations such as lobby, conference rooms, private office, and/or agile desk, etc. The sensor blocks, the gateway, and/or the remote computer system can then: extract boundaries between types of areas within the space from the annotated map; project these boundaries into known and mapped fields of view of sensor blocks in the space; and assign human detection and representation modes to discrete regions in the fields of view of these sensor blocks between these boundaries.

Each sensor block can then selectively execute its assigned human detection and representation modes to characterize human motion within discrete regions of its field of view according to area definitions supplied by the manager, administrator, or other operator.

Accordingly, in this example, the network of sensor blocks can cooperate to: capture only locations of humans in and around private work areas within the space; and transition to generating and maintaining human containers and human values for humans who move outside of these private areas. Therefore, human-related data captured and stored by the sensor block network and the gateway for these areas in the space is limited to representing motion of unique but anonymous humans into and out of private work areas, but excludes links between human locations and human hash values for humans present within these private work areas, thereby preventing identification of a particular human represented by a human container or corresponding trajectory by linking a terminus of this trajectory to a known office occupied by or an agile desk commonly used by a particular human.

Similarly, the network of sensor blocks can cooperate to: capture high resolution or blurred frames, extract locations of humans from these frames, and return both these frames and extracted human locations to the gateway for select public and coworking areas within the space; and transition to generating and maintaining human containers and human values for humans who move outside of these public and coworking areas within the space. Therefore, human-related data captured and stored by the sensor block network and the gateway in these public and coworking areas may contain identifying information for humans. However, the sensor blocks and/or the gateway preserve separation between these identifying human data and human hash values by excluding human container generation and updates for humans detected in these public and coworking areas, thereby preventing or hindering identification of a particular human represented by a human container or corresponding trajectory by matching a complete trajectory representing in a particular human container to a human detected and identified in a frame depicting a public or corkwing area within the space.

11.2.3 Time

In another implementation, a sensor block transitions between human detection and representation modes based on time (e.g., time of day, day of week).

In one example, a sensor block operates in the human location mode and returns only human locations to the gateway at beginning and end of a workday, thereby: preventing an operator from monitoring exact times that individuals enter and leave the office; and/or thus improving employee confidence that their daily work start and end times are not being tracked or monitored by an administrator. The sensor block then operates in the human hash mode to generate and update human containers and human hash values during a primary work period—such as between 10 AM to noon and 1 PM to 3 PM—to enable the remote computer system to track use of the space.

In this example, the sensor block can then operate in the obscured image mode to capture frames with blurred or redacted faces after hours when the office remains open or unlocked to support basic security within the space while providing a degree of privacy for employees continuing to work in the space. Furthermore, the sensor block can operate in the high-resolution image mode to capture high-resolution frames with human faces shown after hours when office is closed or locked in order to support more comprehensive security efforts when employees are not expected in the space.

11.2.4 Human Presence and Quantity of Humans

In another implementation, upon capturing a next frame, a sensor block implements methods and techniques described above to detect and count unique humans in the frame.

Then, if the sensor block detects no human in the frame, the sensor block can offload the original frame to the gateway, which can then store this frame in an image database to enable a manager, administrator, or other operator to remotely view the space in real-time or post hoc (e.g., to visually monitor cleanliness of the space and to coordinate cleaning). In particular, if no humans are present in the frame, the frame may be likely to exclude personal identifying information and therefore represents an opportunity to record visual information of a region of the space in the field of view of the sensor block without sacrificing privacy of humans present in the space. Accordingly, the sensor block and the gateway can cooperate to preserve and store the frame.

However, if the quantity of humans is non-zero but less than or equal to a first threshold quantity (e.g., three humans), the sensor block can operate in the human location mode to extract locations of humans only from the frame, discard the frame, and return these locations—and not human containers or human hash value updates—to the gateway.

Conversely, if the quantity of humans is non-zero and greater than the first threshold quantity, the sensor block can operate in the human hash mode to generate and update human containers and human hash values based on features extracted from the frame, to discard the frame, and to transmit human containers or human hash value updates to the gateway.

Additionally or alternatively, if the quantity of humans is greater than or equal to a second threshold quantity (e.g., fifteen humans) and/or if an average distance between humans present in the field of view of the sensor is less than a threshold distance (e.g., four feet), the sensor block can operate in the high-resolution or obscured image mode to offload the original or blurred frame to the gateway, which can store the image and enable a manager, administrator, or other operator to remotely view crowds within the space, which may be anomalous within the space and prompt investigation.

Therefore, the sensor block can fully abstract all human-related information to solely locations of humans and return these abstracted data to the gateway if a very small—but non-zero—number of humans are detected in a frame, thereby: a) enabling the remote computer system (or the gateway, the network of sensor blocks) to maintain a complete, contiguous record of locations of humans throughout the space; while also b) discarding (i.e., not deriving, not storing, deleting) all information that may be manipulatable to uniquely identify a particular human depicted in the frame (e.g., avoiding generation of a human hash value that could be reversed through brute force queries of possible human characteristics). However, the sensor block can also capture more human-related data with decreasing obfuscation of identifying data as the quantity and/or density of humans increases in the field of view of the sensor block.

11.2.4.1 Human Counter+True Occupancy

In one variation, the network of sensor blocks can implement a human counter mode in which each sensor block returns a human count (e.g., occupancy count) of humans extracted from frames and offloads the human count to the computer system. The computer system can then receive a human count from each sensor block deployed in the space, calculate a total human count (e.g., total occupancy count), and update the total human count in near real-time to achieve a true occupancy count for the space.

For example, during a setup period preceding the first time, the sensor block can retrieve a first map, from a set of maps of the space that defines a set of human counter regions in a field of view of each sensor block in the set of sensor blocks and assigned to a time window for human counting (e.g., one hour, 12 PM-1 PM). Then, in response to the time window for human counting intersecting a first time (e.g., 12:15 PM) at the sensor block and, in response to a first human counter region intersecting the field of view of the sensor block, the sensor block can: detect a first set of humans in the first frame; calculate a human count representing the first quantity of humans, based on the first set of humans in the first frame; and transmit the human count to the computer system. At approximately the first time, the computer system can: receive a set of human counts from the set of sensor blocks; and calculate a total human count for the space based on a combination of the set of human counts.

Additionally, in response to detecting absence of motion within the field of view of the camera arranged in the first sensor block, and in response to the time window for human counting expiring, the sensor block can: detect absence of humans within the field of view of the camera; calculate a second human count representing a human counter region in the set of human counter regions as unoccupied; and transmit the second human count to the computer system. The computer system can then update the human count for this sensor block and the total human count to achieve a true occupancy count in near real-time.

Alternatively, the network of sensor blocks can implement the methods and techniques described below according to a time synchronization protocol to transmit human counts at the end of a time interval and the computer system can similarly update the total occupancy count of the space at the end of the time interval.

Therefore, each sensor block in the space can calculate an occupancy count of humans detected within a human counter region of the space and the computer system can collect these occupancy counts to calculate a total occupancy count of the space. However, the sensor block can detect absence of motion and absence of humans (e.g., human count of zero) and the computer system can update the total occupancy count to achieve a true occupancy count of the space.

11.2.5 Motion

In another implementation, a sensor block transitions between human detection and representation modes based on speed of humans (or objects more generally) in the field of view of the sensor block.

In one example, a sensor block estimates (e.g., interpolates) speeds of humans in its field of view based on changes in positions of individual—but anonymous—humans tracked across sequences of frames captured by the sensor block. In this example, when a first human moves into the field of view of the sensor block and the sensor block detects the first human moving with a nominal speed range corresponding to human walking, the sensor block can operate in a human hash mode to return and update a human container—including a human hash value and keypoints specific to the first human—to the gateway specifically for the first human. The sensor block can continue to operate in the human hash mode specifically for the first human while the first human moves in the nominal speed range within the field of view of the sensor block. If the first human stops or slows below the nominal speed range, the sensor block can transition to the human location mode specifically for the first human, thereby a) separating the location of the first human from the human hash value and human container of the first human and b) inhibiting identification of the first human based on locations in the space that the first human stops or frequently occupies (e.g., a desk, a conference room). The sensor block can selectively execute and transition between the human hash mode human and location mode for each other unique—but anonymous—human detected in frames captured by the sensor block.

Furthermore, rapid motion of a human in the space may indicate a security threat. Thus, if the sensor block detects a human entering the field of view of the sensor block at greater than the nominal speed range, or if a human in the field of view of the sensor block transitions to moving at greater than the nominal speed range, the sensor block can transition to the obscured image and return obfuscated images to the gateway while concurrently executing the human hash mode for all humans detected in the field of view of the sensor block.

In another example, two sensor blocks can track humans within the space if the field view of each sensor block intersects a human tracking region predefined by the user (e.g., administrator or manager affiliated with the space). In this example, during a setup period, the computer system can retrieve a first map, from a set of maps of the space: defining an object tracking region (e.g., human tracking region) intersecting a first field of view of the first sensor block and a second field of view of the second sensor block; and assigned to a time window for object tracking (e.g., human tracking). At a first time, the first sensor block can detect the first object (e.g., a first human) intersecting the object tracking region (e.g., human tracking region) in the first frame. At a second time, the second sensor block can detect the second object (e.g., a second human) intersecting the object tracking region (e.g., human tracking region) in the second frame. Then, in response to the time window for object tracking (e.g., human tracking) intersecting the first time and the second time, the computer system can generate the anonymized trajectory of the first object (e.g., first human) based on the first object container (e.g., first human container).

However, each sensor block can operate in or transition between the foregoing modes in any other way and responsive to any other context or condition within the field of view of the sensor block or within the space more generally.

12. Time Synchronization

Generally, each sensor block in the network of sensor blocks can include an internal clock and the computer system can implement a time synchronization protocol—executed by the network of sensor blocks—to synchronize these internal clocks for data transmission.

More specifically, each sensor block can synchronize a corresponding internal clock with a master clock located at a base station within the space and transmit non-optical data to the computer system at the beginning of a synchronization interval. The computer system can then receive these non-optical data (e.g., object containers, locations of objects) from each sensor block in the network of sensor blocks. The computer system can also leverage the time synchronization protocol to transmit the object hash manifest to the network of sensor blocks at the beginning of a synchronization interval and/or to generate anonymized trajectories of objects at the expiration of the synchronization interval.

Furthermore, the computer system can implement the time synchronization protocol—executed by the network of sensor blocks—to reduce the quantity of transmissions, wireless power, and energy consumption of the network of sensor blocks, thereby extending the battery life of each sensor block.

12.1 Transmission of Object Containers

In one implementation, the computer system can transmit the time synchronization protocol defining a set of synchronization intervals (e.g., 10 seconds, 5 minutes, 10 minutes) to synchronize transmission of object containers, updated object containers with revised characteristics, and locations of objects from each sensor block in the network of sensor blocks, thereby minimizing wireless power and energy consumption of each sensor block.

For example, during a setup period, the computer system can: access a time synchronization protocol including a set of synchronization intervals; and transmit the time synchronization protocol to the set of sensor blocks. At a first time (e.g., 2:03 PM), in response to detecting motion in the field of view of a camera arranged in a sensor block and in response to a first synchronization interval (e.g., 10 minutes) intersecting the first time, the sensor block can access the first frame captured by the camera arranged in the sensor block and located within the space. Then, in response to expiration of the first synchronization interval (e.g., 2:10 PM) the sensor block can transmit the first object container and the first location of the first object labeled with the first time to the computer system.

Additionally, at a second time (e.g., 2:07 PM), in response to detecting motion in the field of view of a second camera arranged in a second sensor block, and in response to the first synchronization interval (e.g., 10 minutes) intersecting the second time, the second sensor block can access the second frame captured by the second camera arranged in the second sensor block and located within the space. The second sensor block can then implement the methods and techniques described above to identify a second object in the second frame as the first object previously detected by the first sensor block at the first time. Then, in response to expiration of the first synchronization interval (e.g., 2:10 PM), the second sensor block can: write the second set of hash values to update the first object container; and transmit the updated first object container and the second location of the first object labeled with the second time to the computer system.

Thus, the computer system can implement a time synchronization protocol—executed by the network of sensor blocks—to synchronize transmission of object containers and locations of objects at the expiration of a synchronization interval (e.g., 10 minutes) from each sensor block in the network of sensor blocks.

12.1.1 Object Hash Manifest+Anonymized Trajectories

Then, the computer system can receive the updated first object container containing revised characteristics and the second set of hash values from the sensor block during and/or at the end of a synchronization interval, implement the methods and techniques described above to update the object hash manifest, and distribute the object hash manifest to the network of sensor blocks at the beginning of the next synchronization interval in the time synchronization protocol. Alternatively, the computer system can receive object containers containing original characteristics and hash values from the network of sensor blocks at the end of the synchronization interval and implement the methods and techniques described above to maintain the object hash manifest for the next synchronization interval in the time synchronization protocol.

Furthermore, in response to expiration of the synchronization interval, the computer system can implement the methods and techniques described above to generate an anonymized trajectory of the first object based on the updated first object container. The computer system can implement similar methods and techniques for each other object detected in each other frame captured at the sensor block.

13. Collisions

Generally, the network of sensor blocks and the computer system can cooperate to characterize collisions between object containers and define a target quantity of collisions (e.g., 5 collisions, 10 collisions, 30 collisions) between these object containers as a function of a characteristic of the space (e.g., human count, location, velocity of humans, time of day) to achieve no or minimal exposure of identifying human information to a user or other entity.

Furthermore, the target quantity of collisions corresponds to a minimum and/or maximum privacy threshold—predefined by a user (e.g., administrator or manager affiliated with the space) and assigned to a characteristic of the space—for tracking humans within the space. The network of sensor blocks can then leverage the minimum and maximum privacy thresholds to define a target quantity of collisions that maintains the privacy and anonymity of humans in the space. The minimum and/or maximum privacy threshold can also correspond to a portion of collisions (e.g., 10%, 25%, 90%) between object containers.

More specifically, during a first time period, each sensor block in the network of sensor blocks can access a first frame captured by a camera arranged in the sensor block. Then, in response to detecting a first human in the first frame, the sensor block can: extract a first set of features representing the first human from the frame; represent the first set of features in a first object container, in a first set of object containers corresponding to the first time period, the first object container defining a first feature length. Each sensor block can then: characterize a first quantity of collisions between object containers in the first set of object containers; access a first characteristic of the space; and access a first target quantity of collisions—defined by the computer system—between object containers in the first set of object containers based on the first characteristic. Then, responsive to the first target quantity of collisions exceeding the first quantity of collisions, the sensor block can define a second feature length less than the first feature length. Each sensor block can then repeat these methods and techniques for each other human and represent features of these other humans in object containers defining the second feature length.

In one implementation, the computer system can query the first set of object containers for a subset of features and, in response to a second object container containing the subset of features, identify a collision event. In another implementation, the computer system can transform features into a set of hash values, query these object containers for a subset of hash values and, in response to a second object container containing the subset of hash values, identify a collision event. In yet another implementation, the computer system can transform features into indices via a Bloom filter (e.g., privacy filter) query the first set of object containers for a first index, and in response to a second object container assigned to the first index, identify a collision event.

13.1 Dynamic Feature Length: Target Collision per Sensor Block Field of View

The computer system can: define a first (or "initial") feature length—such as a quantity of features within an array or vector—during a setup period; assign a target quantity or proportion of collisions per sensor block field of view; and distribute this first feature length and target quantity or proportion of collisions to the network of sensor blocks deployed in the space.

In one implementation, a sensor block can implement Blocks of the method S100 to: capture an image; detect humans in the image; extract features representing each human from the image; store features representing each human in an object container (e.g., an array, vector) of the first feature length; detect collisions between the concurrent object containers; increase the feature length if the quantity of these collisions are greater than the target quantity or proportion of collisions; and vice versa. The sensor block can then regenerate or update the object containers for this image based on this revised feature length before offloading these revised object containers to the gateway.

For example, during a first time period, the sensor block can: store the first set of features in the first object container in the first set of object containers, the first object container defining a first quantity of features (e.g., 15 features) of the first feature length; calculate a second quantity of features (e.g., 10 features) of a second feature length less than the first quantity of features (e.g., 15 features) of the first feature length in response to the first target quantity of collisions exceeding the first quantity of collisions; and represent the second set of features in the second object container, in the second set of object containers corresponding to the second time period, the second object container defining the second quantity of features (e.g., 10 features) of the second feature length.

During a second time period, the sensor block can: characterize a second quantity of collisions between object containers in the second set of object containers; access a second characteristic of the space; define a second target quantity of collisions between object containers in the second set of object containers based on the second characteristic; and, in response to the second target quantity of collisions falling below the second quantity of collisions, define a third feature length (e.g., 12 features) greater than the second feature length and less than the first feature length. During a third time period, the sensor block can access a third frame captured by the camera arranged in the sensor block and, in response to detecting a third human in the third frame: extract a third set of features representing the third human from the third frame; and represent the third set of features in a third object container, in a third set of object containers corresponding to the third time period, the third object container defining the third feature length (e.g., 12 features).

Therefore, the sensor block can implement closed-loop controls to dynamically adjust the feature length of object containers it generates in (near) real-time in order to: achieve target quantities of collisions within its field of view regardless of conditions in fields of view of other sensor blocks in the network; and maintain a minimum or target anonymity—defined by the computer system—for humans within its field of view at all times. More specifically, the sensor block can iteratively update its feature length during each sampling period in order to achieve a target quantity or proportion of collisions between object containers before offloading any data—which may otherwise contain personal identifying information—to the gateway or computer system.

13.1.1 Dynamic Feature Length: Global Target Collision per Sensor Block Network

Alternatively, the computer system can: define a first (or "initial") feature length—such as a quantity of features within an array or vector—during a setup period; assign a global target quantity or proportion of collisions for the network of sensor blocks; and distribute this first initial feature length and global target quantity or proportion of collisions to the network of sensor blocks deployed in the space. Furthermore, each sensor block in the network of sensor blocks can offload object containers to the computer system to define a revised and/or updated feature length for the next sampling period.

For example, during a sample period, each sensor block can implement Blocks of the method S100 to: capture an image; detect humans in the image; extract features representing each human from the image; store features representing each human in an object container (e.g., an array, vector) of the initial feature length; and offload these object containers to the gateway and/or computer system. The computer system can then: receive these object containers from each sensor block; detect a first quantity of collisions between object containers; and derive a target quantity of collisions between object containers in the first set of object containers based on a first characteristic of the space (e.g., total occupancy, object velocity, location, time-of-day) represented in the object containers. Then, in response to the target quantity of collisions exceeding the first quantity of collisions, the computer system can: define a first feature length (or "updated feature length") less than the initial feature length; and distribute the updated feature length to the network of sensor blocks. Accordingly, the set of sensor blocks can then implement this updated feature length for the next sampling period.

Additionally, in response to the target quantity of collisions falling below the first quantity of collisions, the computer system can: define a second feature length greater than the first feature length and the initial feature length; and distribute the second feature length to the network of sensor blocks.

Therefore, the computer system can define a global feature length for the network of sensor blocks, the network of sensor blocks can offload object containers at the end of a sampling period, and the computer system can update the global feature length for the next sampling period, thereby reducing the energy and power consumption of each sensor block.

13.2 Collision Detection+Anonymized Trajectories

In one implementation, the computer system can detect a set of collision events between object containers, link these object containers to characterize collisions, and derive anonymized trajectories of objects between these linked containers. The computer system can thus leverage these collision events and anonymized trajectories to generate object and human flow metrics with no or minimal exposure of identifying human information.

For example, the sensor block can: extract a first location of the first human and the first set of features representing the first human from the first frame; store the first set of features and the first location labeled with a timestamp in the first object container, in the first set of object containers; and offload the first set of object containers to the computer system. The computer system can then isolate a first subset of object containers—containing a second set of features—in the first set of object containers colliding at a first collision time in a set of collision times; isolate a second subset of object containers—containing the second set of features—in the first set of object containers colliding at a second collision time in the set of collision times; identify the second subset of object containers analogous to the first subset of object containers based on the second set of features; detect a first set of collision events between the first subset of object containers and the second subset of object containers; link the first subset of object containers and the second subset of object containers based on the first set of collision events; and derive a first set of anonymized trajectories between the first subset of object containers and the second subset of object containers based on timestamps and locations stored in the first set of object containers.

In another implementation, the sensor block can implement Blocks of the method S100 to transform features representing a human into encrypted hash values according to the cryptographic hash function described above and offload object containers defining an array or vector of encrypted hash values to the computer system. In this implementation, the computer system can thus leverage the cryptographic hash function to detect collision events between object containers with no or minimal exposure of identifying human information.

For example, during the first time period, the sensor block can: transform the first set of features representing the first human into a first set of encrypted hash values based on a cryptographic object hash function; store the first set of hash values in the first object container in the first set of object containers, the first object container defining an array and/or vector of encrypted hash values; and offload the first set of object containers to the computer system. The computer system can then: query the first set of object containers for a first subset of encrypted hash values in the first set of encrypted hash values contained in the first object container in the first set of object containers; and, in response to a third object container, in the first set of object containers, containing the first subset of encrypted hash values, identify a first collision event between the first object container and the second object container.

In yet another implementation, the computer system can transform features into indices via a Bloom filter, query the first set of object containers for a first index, and detect a collision event based on the first index assigned to two unique object containers.

For example, the computer system can: access a probabilistic data structure defining an initial set of indices, each index in the set of indices corresponding to a feature in an initial set of features; assign a first set of indices to the first set of object containers according to the probabilistic data structure; and generate an index table based on the first set of indices. The computer system can then query the index table for a first index assigned to the first object container in the first set of object containers and, in response to the index table containing the first index assigned to a second object container in the first set of object containers, identify a collision event between the first object container and the second object container.

Therefore, the computer system can implement anonymization measures—such as a cryptographic hash function to encrypt hash values and/or a Bloom filter to assign random indices to object containers—to identify collision events between object containers, to derive anonymized trajectories between linked object containers, and thereby, maintain the privacy and anonymity of humans in the space.

13.3 Space Characteristic

Furthermore, each sensor block in the network of sensor blocks can implement Blocks of the method S100 to access a target quantity of collisions—defined and/or set by the computer system—between object containers based on a characteristic of the space. The characteristic of the space can include human count, location, average velocity of humans, and/or time of day.

In one implementation, the target quantity of collisions as a function of human count (e.g., quantity of humans) in the space can include an occupancy count of humans detected within a field of view of the sensor block or the total occupancy count of humans within the space during a particular time period.

In another implementation, the target quantity of collisions as a function of location can include a set of sensor blocks deployed in a first region of the space (e.g., an agile work area, conference room, hallway, lobby) corresponding to a minimum privacy threshold for tracking humans within the first region or the set of sensor blocks deployed in a second region of the space (e.g., break room, lounge, bathroom) corresponding to a maximum privacy threshold for tracking humans within the second region.

In yet another implementation, the target quantity of collisions as a function of average velocity of humans (e.g., average speed of human traffic) can include an average velocity of the space falling below a velocity threshold and corresponding to the minimum privacy threshold for tracking humans in the space or the average velocity of the space exceeding the velocity threshold corresponding to the maximum privacy threshold for humans in the space.

In another implementation, the target quantity of collisions as a function of time of day can include a time-of-day schedule defining time windows corresponding to business hours (e.g., working hours) and/or non-business hours (e.g., non-working hours) and each time window can be assigned to a target quantity of collisions.

13.3.1 Target Quantity of Collisions+Location

In one variation, the sensor block can access the target quantity of collisions between object containers as a function of location within the space. Furthermore, the location can include a region of the space (e.g., an agile work area, conference room, hallway, lobby, hallway, break room, lounge)—corresponding to a minimum and/or maximum privacy threshold—where a set of sensor blocks in the network of sensor blocks are deployed.

For example, during a first time period, a sensor block in a first set of sensor blocks can access a first region (e.g., agile work area) of the first set of sensor blocks located within the space; access the first target quantity of collisions (e.g., 5 collisions) between object containers in the first set of object containers based on the first region (e.g., agile work area) of the first set of sensor blocks deployed within the space, the first target quantity of collisions (e.g., 5 collisions) corresponding to a minimum privacy threshold for tracking humans within the first region (e.g., agile work area).

During a second time period, a sensor block in a second set of sensor blocks can access a second frame captured by a camera arranged in the sensor block and, in response to detecting a second human in the second frame, extract a second set of features representing the second human from the second frame and represent the second set of features in a second object container, in a second set of object containers corresponding to the second time period, the second object container defining the first feature length; characterize a second quantity of collisions between object containers in the second set of object containers; access a second region (e.g., break room) of the second set of sensor blocks located within the space; and access a second target quantity of collisions (e.g., 20 collisions) between object containers in the second set of object containers based on the second region (e.g., break room) of the second set of sensor blocks, the second target quantity of collisions (e.g., 20 collisions) corresponding to a maximum privacy threshold for tracking humans within the second region (e.g., break room). Responsive to the second target quantity of collisions (e.g., 20 collisions) exceeding the second quantity of collisions, the sensor block can define a third feature length less than the second feature length and the first feature length.

Therefore, the sensor block can access a first target quantity of collisions corresponding to the first feature length to track humans in the first region (e.g., agile work area) and a second target quantity of collisions corresponding to a second feature length less than the first feature length to achieve the maximum privacy of humans detected in the second region (e.g., break room).

13.3.2 Target Quantity of Collisions+Human Count

In another variation, the sensor block can access the target quantity of collisions—defined by the computer system—between object containers as a function of human count in the space (e.g., quantity of humans, occupancy count).

For example, during the first time period, the sensor block can: calculate a total quantity of humans in the space based on the first set of object containers; detect the first quantity of collisions between object containers in the first set of object containers; calculate a second quantity of humans less than the total quantity of humans based on the first quantity of collisions between object containers in the first set of object containers; access the total quantity of humans within the space; and access the first target quantity of collisions between object containers in the first set of object containers based on the total quantity of humans within the space. Thus, the sensor block can adjust the privacy and anonymity of humans in the space according to the total quantity of humans in the space (e.g., total occupancy count).

13.3.3 Target Quantity of Collisions+Velocity

In yet another variation, the sensor block can access the target quantity of collisions—defined by the computer system—between object containers as a function of the average velocity of humans such as average velocity of human traffic in a region of the space, average velocity of humans in the space, average velocity of one human in the space, etc.

Furthermore, the sensor block can flag a possible security event if the average velocity of a set of humans in the space exceeds a velocity threshold. The sensor block can then access a target quantity of collisions according to a minimum privacy threshold to enable a user to review identifying features of each human in the set of humans. However, if the average velocity of the set of humans in the space falls below the velocity threshold, the sensor block can remove the flag and then define a target quantity of collisions according to a maximum privacy threshold.

For example, the sensor block can extract a first location, a first velocity and the first set of features of the first human from the first frame and access an average velocity of objects in the space. Then, in response to the average velocity of objects in the space exceeding a velocity threshold, the sensor block can access the first target quantity of collisions between object containers in the first set of object containers corresponding to a minimum privacy threshold for tracking humans within the space. During a second time period, in response to the average velocity of objects in the space falling below the velocity threshold, the sensor block can access an updated target quantity of collisions between object containers in the first set of object containers corresponding to a maximum privacy threshold for humans within the space.

Therefore, the sensor block can access the target quantity of collisions as a function of average velocity of humans in the space and corresponding to the minimum and/or maximum privacy threshold.

13.3.4 Target Quantity of Collisions+Time of Day

In yet another variation, the sensor block can access the target quantity of collisions—defined by the computer system—between object containers as a function of time (i.e., time of day). Furthermore, the sensor block can access a time-of-day schedule for the space defining time windows for working hours and non-working hours assigned to a target quantity of collisions.

For example, the sensor block can access a time-of-day schedule for the space defining: a first time window assigned to working hours at the start of a business day (e.g., 7 AM to 9 AM) and a first target quantity of collisions (e.g., 30 collisions); a second time window assigned to working hours at the end of a business day (e.g., 4 PM to 6 PM) and a second target quantity of collisions (e.g., 25 collisions) less than the first target quantity of collisions; and a third time window assigned to non-working hours (e.g., 6 PM to 7 AM) and a third target quantity of collisions (e.g., 0 collisions) less than the first target quantity of collisions and the second quantity of collisions. Then the sensor block can match the time period (e.g., timestamp) to the corresponding time window and target quantity of collisions from the time-of-day schedule. Thus, the sensor block can access the target quantity of collisions for time windows assigned to working hours at the start of a business day, working hours at the end of a business day, working hours during a business day, and/or non-working hours for the space.

13.4 Object Feature Models+Object Hash Function

In one implementation, each sensor block in the network of sensor blocks can leverage a first object feature model to extract a first set of features and then compress the first set of features—via an object hash function—into a first hash value (e.g., 3.7) within a range of hash values (e.g., 3.5 to 4.5) and thus, reduce the feature length of object containers. Each sensor block can then execute Blocks of the method S100 to update the object hash function to define a second hash value greater than the first hash value within the hash value range.

For example, during a first time period, the sensor block can access a first frame captured by a camera arranged in the sensor block. Then, in response to detecting a first human in the first frame, the sensor block can: extract a first set of features representing the first human from the first frame according to a first object feature model; compress the first set of features into a first hash value within a hash value range based on an object hash function; and store the first hash value in a first object container, in a first set of object containers corresponding to the first time period. The sensor block can: characterize a first quantity of collisions between object containers in the first set of object containers; access a first characteristic of the space; and define a target quantity of collisions—corresponding to a minimum privacy threshold for tracking humans within the space—between object containers in the first set of object containers based on the first characteristic. Then, in response to the target quantity of collisions exceeding the first quantity of collisions, the sensor block can update the object hash function to define a second hash value greater than the first hash value within the hash value range.

During a second time period, the sensor block can access a second frame captured by the camera arranged in the sensor block. Then, in response to detecting a second human in the second frame, the sensor block can: extract a second set of features representing the second human from the second frame according to a second object feature model; compress the second quantity of features into the second hash value within the hash value range based on the updated object hash function; and store the second hash value in a second object container, in a second set of object containers corresponding to the second time period.

Furthermore, the sensor block can transmit the first object feature model, the second object feature model, and the updated object hash function to the computer system for distribution to the network of sensor blocks. The computer system can then implement the methods and techniques described above to distribute object feature models and the updated hash function with the object hash manifest according to a particular time interval (e.g., once a day, once every 10 minutes) and/or according to a time synchronization schedule.

Therefore, the network of sensor blocks can extract features for other humans and compress these features into a hash value according to the object feature models and the updated object hash function. The network of sensor blocks can leverage these object feature models and the updated object hash function to reduce the quantity of features and hash values assigned to an object and thereby, achieve no or minimal exposure of identifying human information.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for tracking objects moving within a space comprising:
   at a first sensor block, in a set of sensor blocks, at a first time:
      accessing a first frame captured by a camera arranged in the first sensor block and located within the space;
      detecting a first object in the first frame;
      extracting a first location and a first set of features of the first object from the first frame;
      transforming the first set of features into a first set of hash values in an unreadable format according to a cryptographic object hash function;
      storing the first set of hash values in a first object container; and
      transmitting the first object container and the first location of the first object labeled with the first time to a computer system;
   at the computer system:
      receiving a first set of object containers from each sensor block in the set of sensor blocks comprising the first object container; and
      distributing the first set of object containers to the set of sensor blocks;
   at the first sensor block at a second time:
      accessing a second frame captured by the camera arranged in the sensor block;
      detecting a second object in the second frame;
      extracting a second location and a second set of features of the second object from the second frame;

transforming the second set of features into a second set of hash values in the unreadable format according to the cryptographic object hash function;
querying the first set of object containers for the second set of hash values according to a privacy filter; and
in response to a second object container, in the first set of object containers, containing a threshold quantity of hash values in the second set of hash values:
identifying the second object as previously detected by a second sensor block in the set of sensor blocks and represented by the second object container; and
transmitting the second location of the second object labeled with the second time to the computer system;
generating an anonymized trajectory of the first object based on the first object container; and
at the computer system:
receiving a query for a subset of hash values from a user portal;
querying the first set of object containers for the subset of hash values according to the privacy filter; and
in response to a third object container containing the subset of hash values:
generating a notification correlating the first object to the subset of hash values; and
rendering the notification within the user portal.

2. The method of claim 1:
further comprising at a second sensor block at the second time:
accessing a third frame captured by the camera arranged in the sensor block;
detecting a third object in the third frame;
extracting a third location and a third set of features of the third object from the third frame;
transforming the third set of features into a third set of hash values according to the object hash function;
querying the first set of object containers for the third set of hash values; and
in response to a third object container, in the first set of object containers, containing the threshold quantity of hash values in the third set of hash values:
identifying the third object as the first object previously detected by the first sensor block, in the set of sensor blocks, and represented by the first object container;
writing the third set of hash values to the first object container to generate an updated first object container; and
transmitting the third location of the first object labeled with the second time to the computer system; and
wherein generating the anonymized trajectory of the first object comprises generating the anonymized trajectory of the first object based on the updated first object container.

3. The method of claim 1:
wherein extracting the first location and the first set of features comprises extracting the first location, corresponding to an entrance of a hallway within the space, and the first set of features of the first object from the first frame;
wherein extracting the third location and the third set of features comprises extracting the third location, corresponding to an exit of the hallway within the space, and the third set of features of the third object from the third frame; and
further comprising deriving a statistic representing a route between the entrance and exit of the hallway, based on the first location of the first object, the third location of the first object, and the anonymized trajectory of the first object.

4. The method of claim 1:
further comprising, at a computer system, during a setup period preceding the first time:
accessing an initial sequence of frames from a population of sensor blocks deployed in the space;
detecting a corpus of objects in the initial sequence of frames;
extracting an initial set of locations of each object in the corpus of objects from the corpus of frames;
accessing a table of characteristic values defining:
an object type in a set of object types of the corpus of objects;
a maximum and a minimum width of a frame in a first sequence of frames; and
a range of colors representing presence of pixels in the frame in the first sequence of frames; and
correlating each object in the corpus of objects with a set of characteristic values in the table of characteristic values to generate an object feature model;
wherein extracting the first location and the first set of features of the first object comprises extracting the first set of features of the first object from the first frame according to the object feature model; and
wherein extracting the second location and the second set of features of the second object comprises extracting the second set of features of the second object from the second frame according to the object feature model.

5. The method of claim 1:
wherein detecting the first object in the first frame comprises detecting a first human in the first frame;
wherein extracting the first location and the first set of features comprises:
calculating the first location of the first human based on a centroid of pixels representing a first face of the first human in the first frame;
calculating a first orientation of the first human based on a vector parallel to a ground plane and normal to the first face of the first human; and
extracting the first set of features of the first human from the first frame;
wherein transmitting the first object container and the first location of the first object comprises transmitting the first object container, the first orientation, and the first location of the first human labeled with the first time to the computer system; and
wherein generating the anonymized trajectory of the first object comprises generating the anonymized trajectory of the first human based on the first object container.

6. The method of claim 1:
further comprising, during a setup period preceding the first time, retrieving a first map, from a set of maps of the space:
defining a set of human counter regions in a field of view of each sensor block in the set of sensor blocks; and
assigned to a time window for human counting;
wherein detecting the first object in the first frame comprises, in response to the time window for human counting intersecting the first time and in response to a first human counter region intersecting the field of view of the first sensor block:

detecting a first set of humans in the first frame;
calculating a human count representing the first quantity of humans, based on the first set of humans in the first frame; and
transmitting the human count to the computer system; and
wherein receiving the first set of object containers comprises:
receiving a set of human counts from the set of sensor blocks; and
calculating a total human count for the space based on a combination of the set of human counts.

7. The method of claim 6, further comprising in response to detecting absence of motion within the field of view of the camera arranged in the first sensor block and in response to the time window for human counting expiring:
detecting absence of humans within the field of view of the camera;
calculating a second human count representing a human counter region in the set of human counter regions as unoccupied; and
transmitting the second human count to the computer system.

8. The method of claim 1, further comprising at the first sensor block at a third time:
accessing a third frame captured by the camera arranged in the first sensor block;
detecting a third object in the third frame;
extracting a third location and a third set of features of the third object from the third frame;
transforming the third set of features into a third set of hash values according to the object feature model;
querying the first set of object containers for the third set of hash values;
in response to a third object container, in the first set of object containers, excluding the threshold quantity of hash values in the third set of hash values:
identifying the third object as undetected at the first time and at the second time;
storing the third set of hash values in a fourth object container; and
transmitting the fourth object container and the third location of the third object labeled with the third time to the computer system; and
generating a second anonymized trajectory of the third object based on the fourth object container.

9. The method of claim 8:
wherein identifying the third object as undetected at the first time and at the second time comprises identifying the third object as entering the imaged space between the first time and the second time; and
further comprising, at the computer system, at approximately the third time:
receiving a second set of object containers from each sensor block in the set of sensor blocks comprising the fourth object container; and
distributing the first set of object containers and the second set of object containers to the set of sensor blocks.

10. The method of claim 1:
further comprising, at the computer system during a setup period preceding the first time:
accessing a time synchronization protocol comprising a set of synchronization intervals; and
transmitting the time synchronization protocol to the set of sensor blocks;

wherein accessing the first frame captured by the camera comprises, in response to detecting motion in the field of view of the camera arranged in the sensor block and, in response to a first synchronization interval intersecting the first time, accessing the first frame captured by the camera arranged in the first sensor block and located within the space; and
wherein transmitting the first object container and the first location of the first object comprises in response to expiration of the first synchronization interval, transmitting the first object container and the first location of the first object labeled with the first time to the computer system.

11. A method for tracking objects moving within a space comprising:
at a computer system:
accessing a time synchronization protocol comprising a set of synchronization intervals; and
transmitting the time synchronization protocol to a set of sensor blocks arranged in the space;
at a first sensor block, in the set of sensor blocks, at a first time:
accessing a first frame captured by a first camera arranged in the first sensor block and located within the space;
detecting a first object in the first frame;
extracting a first location and a first set of features of the first object from the first frame;
transforming the first set of features into a first set of hash values according to an object hash function;
storing the first set of hash values in a first object container; and
transmitting the first object container and the first location of the first object labeled with the first time to the computer system;
at the computer system:
receiving a first set of object containers from each sensor block in the set of sensor blocks comprising the first object container; and
distributing the first set of object containers to the set of sensor blocks;
at a second sensor block, in the set of sensor blocks, at a second time:
accessing a second frame captured by a second camera arranged in the second sensor block:
in response to detecting motion in the field of view of the second camera arranged in the second sensor block; and
in response to a first synchronization interval, in the set of synchronization intervals, intersecting the second time;
detecting a second object in the second frame;
extracting a second location and a second set of features of the second object from the second frame;
transforming the second set of features into a second set of hash values according to the object hash function;
querying the first set of object containers for the second set of hash values; and
in response to a second object container, in the first set of object containers, containing a threshold quantity of hash values in the second set of hash values:
identifying the second object as the first object previously detected by the first sensor block, in the set of sensor blocks, and represented by the first object container; and
in response to expiration of the first synchronization interval:
writing the second set of hash values to update the first object container; and transmitting the first object container and the second location of the first object labeled with the second time to the computer system; and generating an anonymized trajectory of the first object based on the first object container.

12. The method of claim 11:

further comprising, at the computer system during a setup period preceding the first time:
  accessing a time synchronization protocol comprising a set of synchronization intervals; and
  transmitting the time synchronization protocol to the set of sensor blocks;

wherein accessing the second frame captured by the second camera comprises in response to detecting motion in the field of view of the second camera arranged in the sensor block and, in response to a first synchronization interval intersecting the second time, accessing the second frame captured by the second camera arranged in the second sensor block and located within the space; and wherein transmitting the second location of the second object comprises in response to expiration of the first synchronization interval:
  writing the second set of hash values to update the first object container; and
  transmitting the updated first object container and the second location of the first object labeled with the second time to the computer system.

13. The method of claim 11:

wherein storing the first set of hash values in the first object container comprises storing the first set of hash values in the first object container, the first object container defining a first feature length;

wherein transmitting the second location of the second object comprises:
  generating an updated first object container, the updated first object container defining the first feature length; and
  transmitting the updated first object container and the second location of the first object labeled with the second time to the computer system; and wherein generating the anonymized trajectory of the first object comprises generating the anonymized trajectory of the first object based on the updated first object container.

14. The method of claim 13:

wherein detecting the second object in the second frame comprises in response to detecting motion in a field of view of the second camera, detecting the second object in the second frame;

wherein extracting the second location and the second set of features of the second object comprises extracting a velocity, the second location, and the second set of features of the second object from the second frame; and wherein generating the updated first object container comprises generating the updated first object container representing a combination of the first set of features detected in the first frame and the second set of features of the first object detected in the second frame and defining the first feature length.

15. The method of claim 11:

further comprising, during a setup period preceding the first time, retrieving a first map, from a set of maps of the space:
  defining an object tracking region intersecting a first field of view of the first sensor block and a second field of view of the second sensor block; and
  assigned to a time window for object tracking;

wherein detecting the first object in the first frame comprises detecting the first object intersecting the object tracking region in the first frame;

wherein detecting the second object in the second frame comprises detecting the second object intersecting the object tracking region in the second frame; and wherein generating the anonymized trajectory of the first object comprises, in response to the time window for object tracking intersecting the first time and the second time, generating the anonymized trajectory of the first object based on the first object container.

16. The method of claim 11, wherein distributing the first set of object containers to the set of sensor blocks comprises generating an object hash manifest defining a hash table comprising the first set of object containers and transmitting the object hash manifest to the set of sensor blocks.

* * * * *